US007298311B2

(12) United States Patent
Horie et al.

(10) Patent No.: US 7,298,311 B2
(45) Date of Patent: Nov. 20, 2007

(54) CONTROLLER APPARATUS FOR CONTROLLING AN ELECTRONIC APPARATUS

(75) Inventors: Hiromasa Horie, Tokyo (JP); Tomokazu Kake, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 334 days.

(21) Appl. No.: 10/308,544

(22) Filed: Dec. 3, 2002

(65) Prior Publication Data
US 2003/0122698 A1    Jul. 3, 2003

(30) Foreign Application Priority Data
Dec. 4, 2001   (JP)   ............... 2001-370262

(51) Int. Cl.
*H04L 17/02*   (2006.01)

(52) U.S. Cl. ............... 341/176; 341/173; 341/174; 341/175; 341/23; 348/734; 345/168; 340/815.78

(58) Field of Classification Search ........... 340/825.22, 340/825.69, 825.72, 3–71, 815.78; 341/176, 341/22, 169, 23, 174, 173; 348/734; 345/158, 345/169, 157, 173; 178/18.01
See application file for complete search history.

(56) References Cited

U.S. PATENT DOCUMENTS

| | | | | |
|---|---|---|---|---|
| 4,844,637 A | * | 7/1989 | Buisson et al. | 341/23 |
| 5,353,016 A | * | 10/1994 | Kurita et al. | 340/825.22 |
| 5,367,316 A | * | 11/1994 | Ikezaki | 345/158 |
| 5,627,531 A | * | 5/1997 | Posso et al. | 341/22 |
| 6,004,049 A | * | 12/1999 | Knox | 400/89 |
| 6,069,614 A | * | 5/2000 | Singhal | 345/158 |
| 6,359,572 B1 | * | 3/2002 | Vale | 341/23 |
| 6,593,914 B1 | * | 7/2003 | Nuovo et al. | 345/169 |
| 6,906,701 B1 | * | 6/2005 | Oueslati et al. | 345/170 |
| 6,946,970 B2 | * | 9/2005 | Stefanik et al. | 340/825.22 |
| 2001/0011953 A1 | * | 8/2001 | Shintani et al. | 340/825.22 |
| 2002/0184626 A1 | * | 12/2002 | Darbee et al. | 725/39 |

FOREIGN PATENT DOCUMENTS

JP    2001 142622    5/2001

(Continued)

*Primary Examiner*—Jeffery Hofsass
*Assistant Examiner*—Sisay Yacob
(74) *Attorney, Agent, or Firm*—Frommer Lawrence & Haug LLP; William S. Frommer; Thomas F. Presson

(57) ABSTRACT

A remote controller apparatus has a controller body, which is provided with annularly disposed display devices displaying as images operating buttons for the purpose of executing functions of a remotely controlled apparatus, and which is further provided with a display device at the center of the annularly disposed display devices. Operating switches are provided below each of the display devices, a transparent shuttle ring is disposed over the annularly disposed display devices, and a transparent center button is provided over the display device at the center. The shuttle ring is caused to rotate, and if necessary operating buttons displayed by each of the display devices are switched to other operating buttons. By doing this, it is possible to assign images of various operating buttons for executing functions of a remotely controlled apparatus to the display devices of the remote controller apparatus, which display this operating buttons, and also possible for a user to operate operating buttons without being aware of which operating buttons correspond to which operations. Additionally, the need to assign more than one operation to one button is eliminated, and it is possible to avoid an excessive increase in the number of operating buttons.

32 Claims, 20 Drawing Sheets

| | FOREIGN PATENT DOCUMENTS | | JP | 2001 242995 | 9/2001 |
|---|---|---|---|---|---|
| JP | 2001 184156 | 7/2001 | | | |
| JP | 2001 216079 | 8/2001 | * cited by examiner | | |

FIG. 19

| DISPLAY NUMBER | IMAGE DISPLAY NUMBER |
|---|---|
| 0 0 | 0 3 7 |
| 0 1 | 0 3 0 |
| 0 2 | 0 0 0 |
| 0 3 | 0 3 4 |
| 0 4 | 0 0 0 |
| 0 5 | 0 3 6 |
| 0 6 | 0 0 0 |
| 0 7 | 0 3 2 |
| 0 8 | 0 0 0 |
| 0 9 | 0 2 9 |
| 1 0 | 0 0 0 |
| 1 1 | 0 3 1 |
| 1 2 | 0 0 0 |
| 1 3 | 0 3 5 |
| 1 4 | 0 0 0 |
| 1 5 | 0 3 3 |
| 1 6 | 0 0 0 |

FIG. 21

| DISPLAY NUMBER | IMAGE DISPLAY NUMBER |
|---|---|
| 0 0 | ▶ DVD |
| 0 1 | ‖ |
| 0 2 | |
| 0 3 | ▶▶‖ |
| 0 4 | |
| 0 5 | ▶▶ |
| 0 6 | |
| 0 7 | ▶ |
| 0 8 | |
| 0 9 | ■ |
| 1 0 | |
| 1 1 | ◀‖ |
| 1 2 | |
| 1 3 | ◀◀ |
| 1 4 | |
| 1 5 | ‖◀◀ |
| 1 6 | |

CONTROLLER APPARATUS FOR CONTROLLING AN ELECTRONIC APPARATUS

This application is related to Japanese Patent Application No. 2001-370262 filed on Dec. 4, 2001, based on which this application claims priority under the Paris Convention and the contents of which are incorporated herein by reference.

BACKGROUND OF THE INVENTION

1. Field of the Invention

The present invention relates to a controller apparatus, an electrical apparatus, a remote control system, an image display method, and a computer readable recording medium onto which an image display program to be executed by a computer is recorded, for remotely controlling a piece of equipment such as a DVD player, a video recorder, or a TV tuner or the like.

2. Description of the Related Art

A remote controller apparatus for remotely controlling apparatuses such as a television receiver and a video recorder, or a game controller for operating a video game machine is designed as a one-way communication apparatus having a variety of operating buttons suited to these apparatuses or a game controller.

These operating buttons are usually uniquely linked to specific operations of the apparatus being controlled. For example, in the case of a playback button, only a playback function would be assigned to the button. There are other cases in which a plurality of functions (operations) is assigned to one operating button. For example, depending upon the application program for a game or the like, there are cases in which key assignments can be freely changed, thereby enabling one operating button to have a number of operations.

However, if characters or symbols for only one operation are marked on an operating button, it is necessary for a user to constantly be aware of what operation is assigned to each operating button, thereby leading to considerable confusion on the part of the user.

Another approach is that of reducing the number of operations assigned to one operating button and increasing the number of operating buttons. The resulting increase in the number of operating buttons, however, makes operation not easier, but actually more difficult.

SUMMARY OF THE INVENTION

Accordingly, it is an object of the present invention to provide a controller apparatus, an electrical apparatus, a remote control system, an image display method, and a computer readable recording medium onto which an image display program to be executed by a computer is recorded, capable of bi-directional communication, and which cause the display of operating buttons in accordance with the apparatus being operated or an application program, thereby enabling the user to easily operate various operating buttons, while limiting the increase in the number of operating buttons, and enabling operating with a small number of operating buttons.

A controller apparatus according to the present invention has one or more display units each of which displays an image relating to a function executable on at least one of the controller apparatus and the electronic apparatus, a manipulatable unit that outputs a signal corresponding to the image in accordance with a manipulation operation, and a communication unit that transmits the signal to the electronic apparatus and receives from the electronic apparatus a function setting data for enabling execution of a function of at least one of the controller apparatus and the electronic apparatus.

The image data defined in the present invention can be an icon or other mark or illustration, and can further be characters such as a numeral or a letter.

BRIEF DESCRIPTION OF THE DRAWINGS

The above and other features of the present invention will be better understood from the exemplary embodiments described below, taken together with the drawings, of which:

FIG. 19 shows a list of image display position data stored in the apparatus memory, this list showing the image display position data, made up of the display numbers sent to the remote controller apparatus and the image display numbers;

FIG. 21 shows a list of image display position data of display images stored in the memory of the apparatus, this view showing the images assigned to the various display devices;

DETAILED DESCRIPTION OF THE PREFERRED EMBODIMENTS

Embodiments of the present invention are described in detail below, with reference made to relevant accompanying drawings.

An embodiment of the present invention is applied to a remote controller apparatus that remotely controls various electrical apparatuses, such as TV tuners for broadcast satellite (BS) or communication satellite (CS), video tape recorders that record data onto a magnetic tape or a hard disk, CD players, DVD players, video game machines, or mobile telephone terminals connectable to the Internet.

The present invention can, as a single remote controller apparatus, control either one piece of hardware, which is a set of such devices as a TV tuner, a video tape recorder, a CD player, a DVD player, a video game machine, or other apparatuses that can be connected to a household network or to the Internet, and can further control such apparatuses individually.

Configuration of the Remote Control Apparatus

Figure 1:
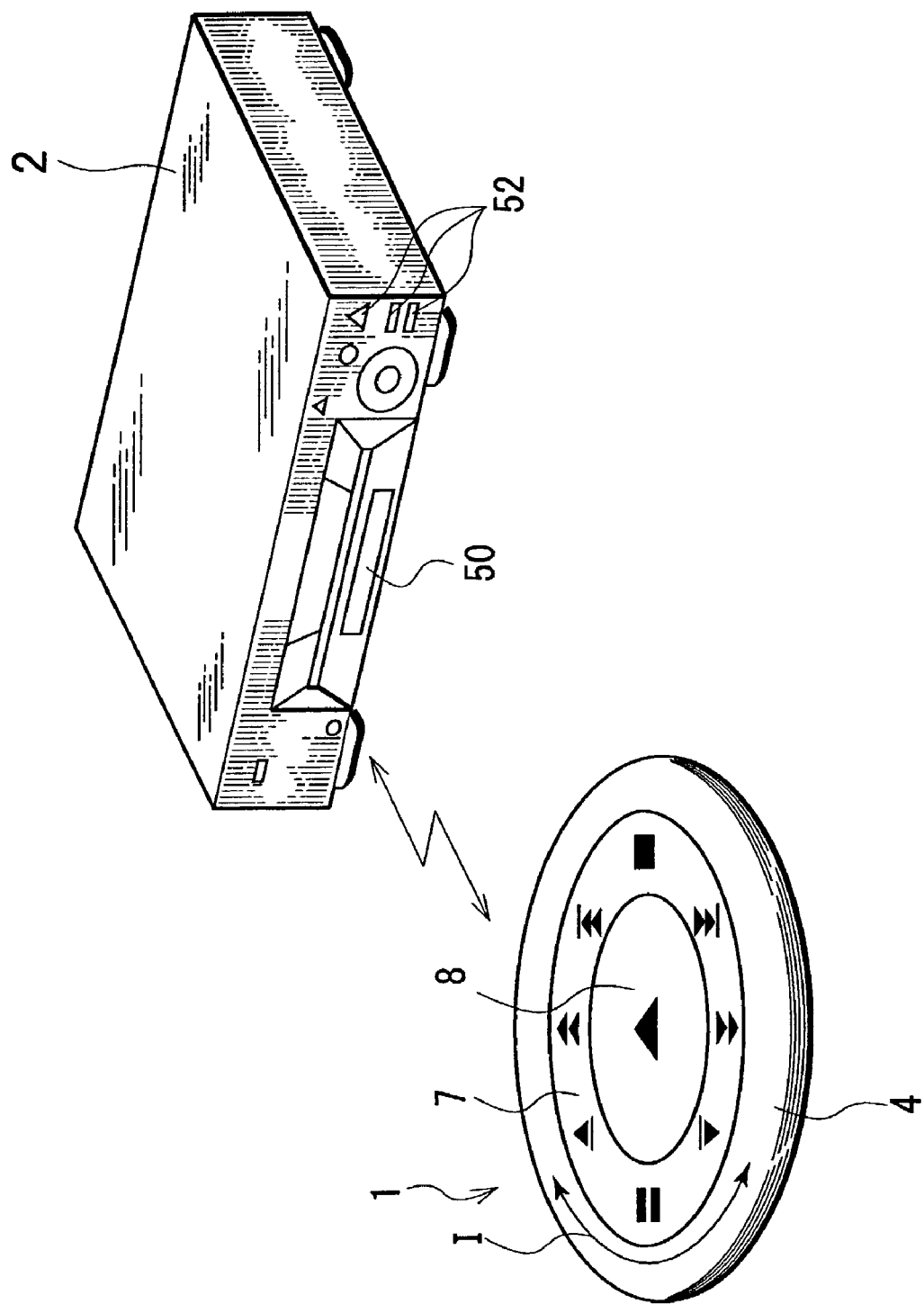
FIG. 1 is an oblique view showing an example of operating an apparatus by a remote controller apparatus according to the present invention.
Figure 2:
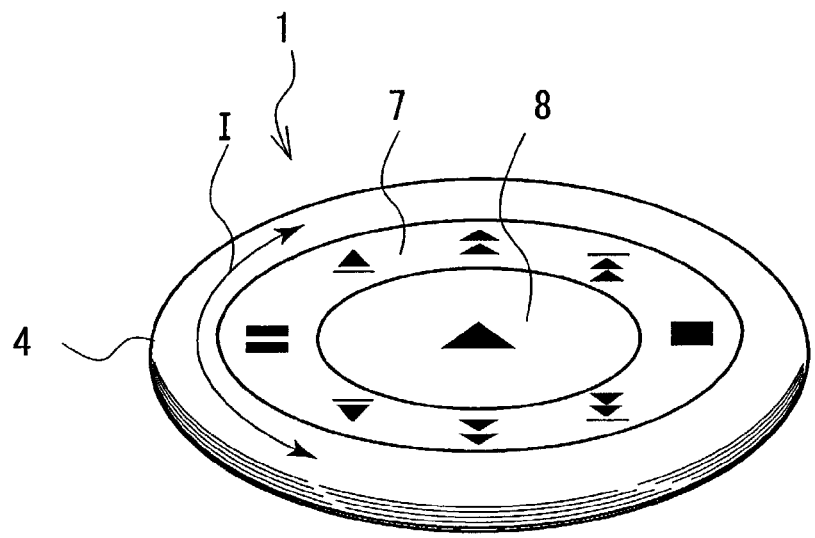
FIG. 2 is an oblique view showing a remote controller apparatus according to an embodiment of the present invention.
Figure 3:
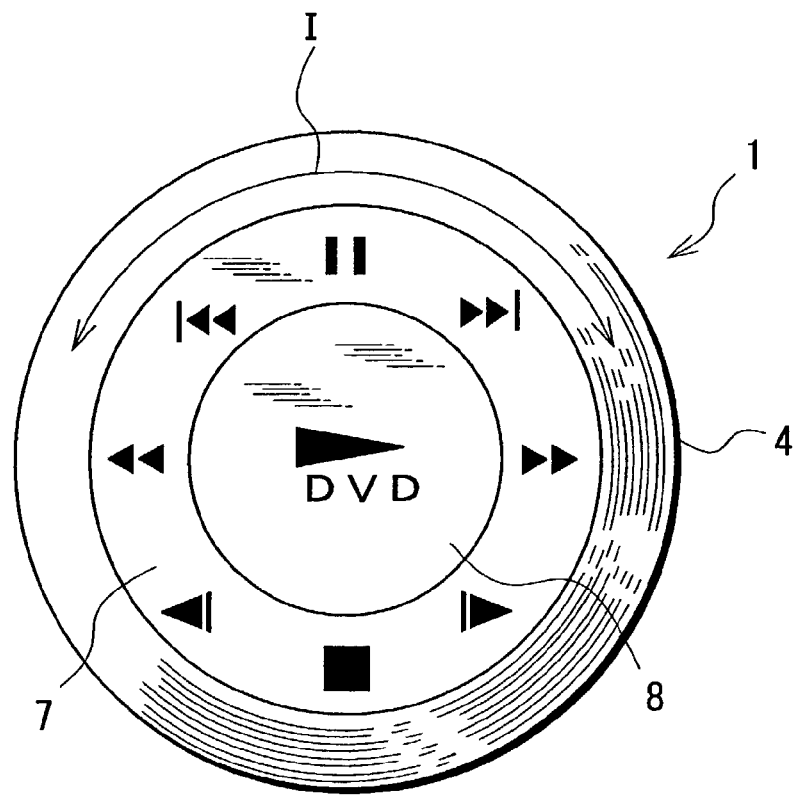
FIG. 3 is a plan view showing a remote controller apparatus according to an embodiment of the present invention.
Figure 4:
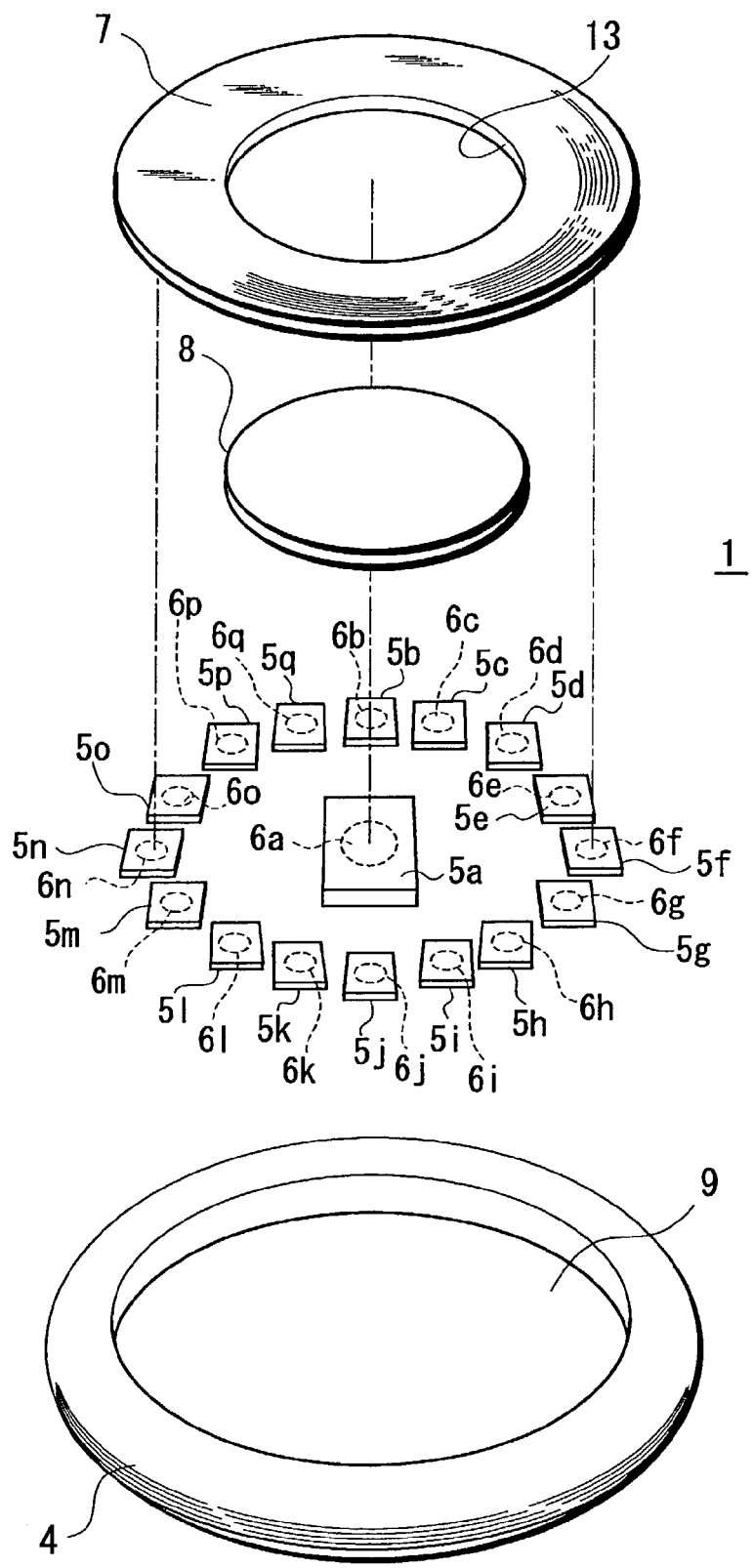
FIG. 4 is an exploded oblique view of a remote controller apparatus according to an embodiment of the present invention.
Figure 5:
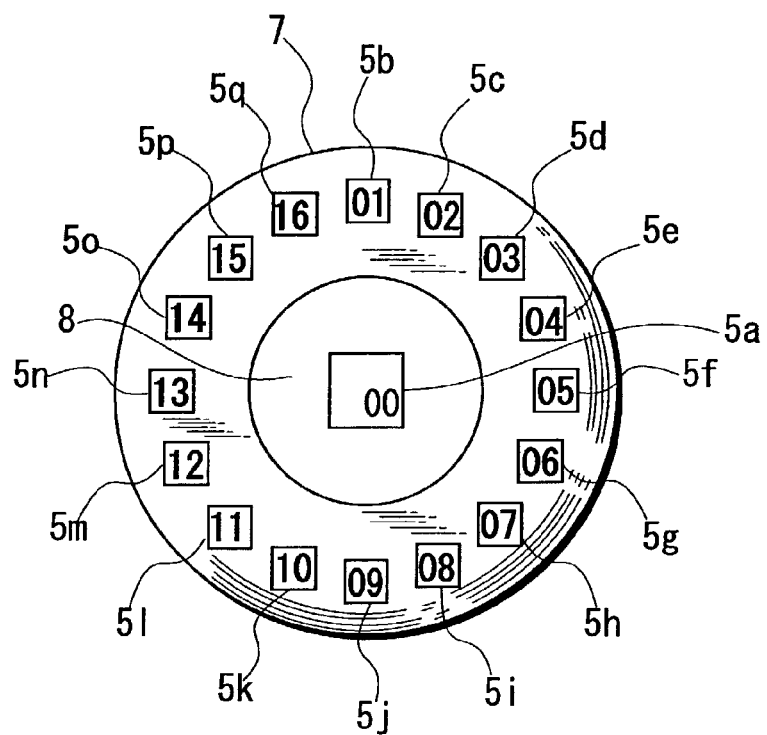
FIG. 5 is a drawing showing placement numbers of each display device provided in a remote controller apparatus according to an embodiment of the present invention.
Figure 6:
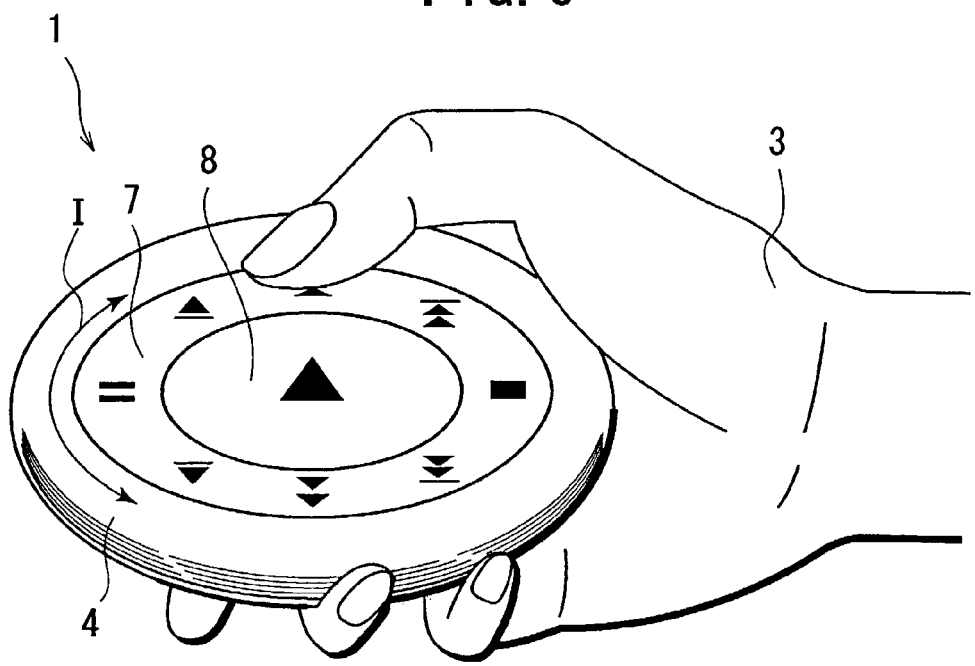
FIG. 6 is an oblique view showing an example of holding in one hand and operating a remote controller apparatus according to an embodiment of the present invention.
Figure 7:
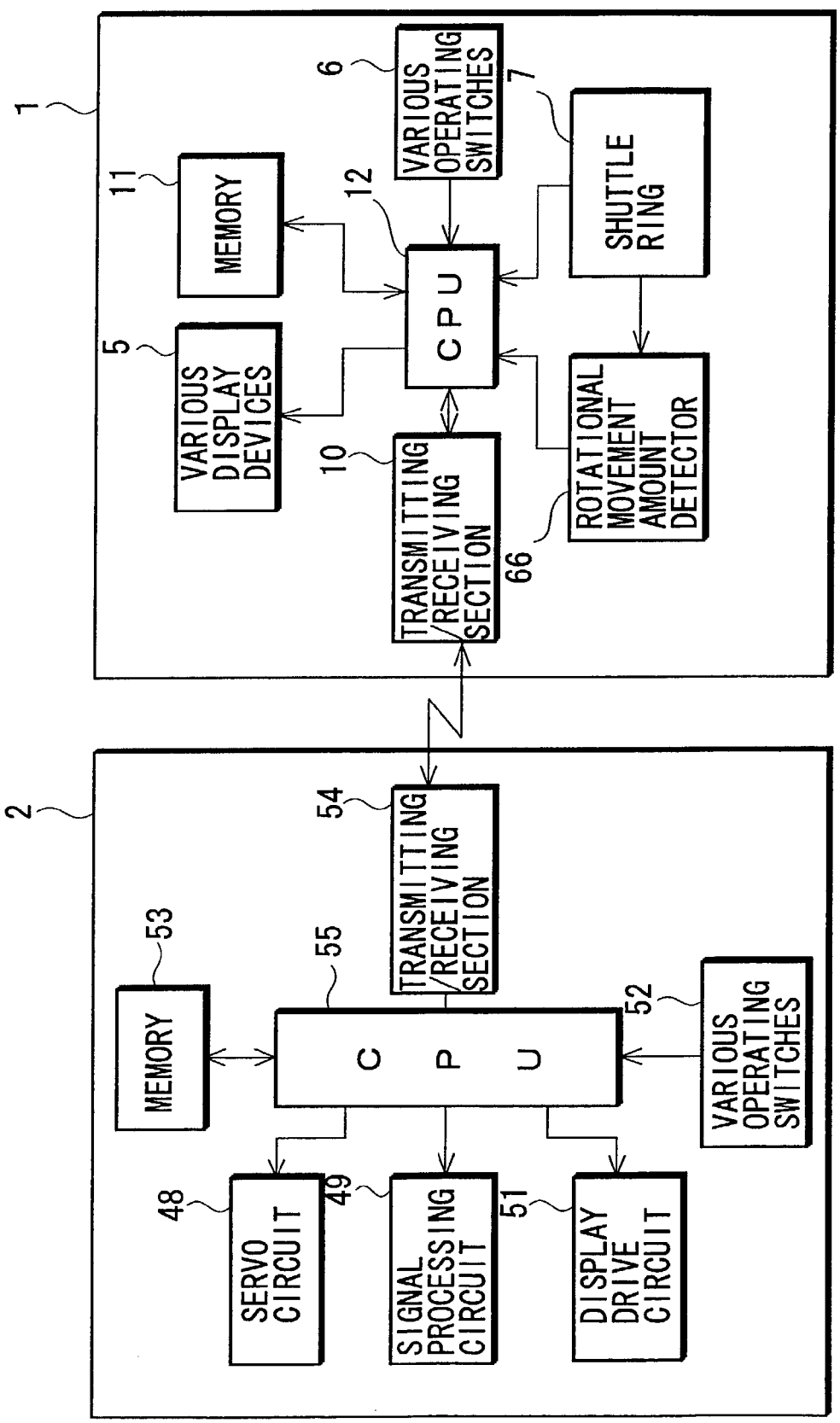
FIG. 7 is a block diagram showing the general configuration of a remote controller apparatus and controlled apparatus according to an embodiment of the present invention.

FIG. 1 is an oblique view showing an example of operating an apparatus by a remote controller apparatus according to the present invention, FIG. 2 is an oblique view showing the remote controller apparatus, FIG. 3 is a plan view showing the remote controller apparatus, FIG. 4 is an exploded oblique view of the remote controller apparatus, FIG. 5 is a drawing showing placement numbers of each display device provided in the remote control apparatus, FIG. 6 is an oblique view showing an example of holding in one hand and operating the remote controller apparatus, and FIG. 7 is a block diagram showing the general configuration of the remote control apparatus.

The remote controller apparatus 1 according to an embodiment of the present invention, as shown in FIG. 1 and FIG. 6, is a remote controller apparatus for the purpose of remotely controlling an apparatus 2, which is, for example, a DVD player or the like, and is a compact controller that can be held within and operated by a single hand 3. This remote controller apparatus 1, as shown in FIG. 2 through FIG. 4, has a controller body 4, a plurality of display devices 5a to 5q mounted to a controller body 4, various operating switches 6a to 6q, disposed below the various display devices 5a to 5q, and which serve as input determining elements, an annular transparent shuttle ring 7 disposed so as to be rotatable above the display devices 5b to 5q, which are annularly disposed at a prescribed distance therebetween, and a transparent center button 8 disposed above the display device 5a, substantially in the center of the annularly disposed display devices 5b to 5q.

The controller body 4, as shown in FIG. 2 and FIG. 6, is shape similar to that of an egg cut vertically, and has a circular mounting depression for mounting the operating switches 6a to 6q, the display devices 5a to 5q, the shuttle ring 7, and the center button 8 (refer to FIG. 4). As shown in FIG. 7, this mounting depression 9 is provided with a transmitting/receiving section 10, which performs exchange of signals with the apparatus 2, a memory 11, which stores image data for displaying operating buttons suitable for the apparatus 2 on the display devices 5a to 5q, a CPU 12, which serves as a controller to control the display devices 5a to 5q, the transmitting/receiving section 10, and the memory 11 and the like, and a power supply (not shown in the drawing).

It is preferable that the controller body 4 be made of a soft, resilient material, so that it feels soft to the touch when held. It will be understood that the controller body 4 can alternatively be formed of a hard plastic material.

In addition to the display devices 5a to 5q being annularly disposed at a prescribed spacing therebetween, there is one thereof that is disposed at the center part of the ring. For example, 16 display devices 5b to 5q are annularly disposed and one display device 5a is disposed in the center of the ring. These display devices 5a to 5q are all independently driven by the CPU 12. Liquid crystal display devices or the like are used as the display devices 5a to 5q.

As shown in FIG. 5, display numbers are assigned to the display devices 5a to 5q, these corresponding to the positions thereof. The center display device 5a has the display number 00 assigned thereto, and the display devices 5b to 5q have the numbers 01, 02, 03, . . . , and 16 assigned to them, starting from the uppermost position (the "12 o'clock" position) of the drawing.

On the display device 5a disposed at the center, a graphic or characters for selection of the type of the apparatus 2 or selection of the apparatus 2 is displayed. Examples are display of the characters DVD, BS TV, and VIDEO, respectively, for a DVD player, a BS TV tuner, and a video tape recorder, and the display of an image of a mobile phone for the case of a mobile phone terminal apparatus that is connectable to the Internet. Characters such as "SOURCE SELECT" are displayed to indicate selection of the apparatus 2. It will be understood that these are merely examples, and that in addition to graphics and characters indicating the type of the apparatus 2 or the selection of the apparatus 2, it is possible to display graphics or characters indicating the operating mode of the apparatus 2.

Graphics or characters indicating the operating mode, for example, of the apparatus 2 are displayed at the annularly disposed display devices 5b to 5q. One example is that in which, for the case of a BS TV tuner, the display devices 5b to 5q display numbers 1, 2, 3, . . . , and 12 to indicate channels. Another example is one in which, for a DVD player, the display devices 5b to 5q display graphics indicating such operations as fast-forward, rewind, stop, and pause or the like. The display devices 5b to 5q can also display graphics or characters to indicate the type of the apparatus 2.

The operating switches 6a to 6q, as shown in FIG. 4, are respectively disposed below the display devices 5a to 5q. These operating switches 6a to 6q are switched on and off when the shuttle ring 7 or the center button 8, to be described below, is pressed.

The shuttle ring 7, as shown in FIG. 2 and FIG. 3, is a transparent ring disposed above the annularly disposed display devices 5b to 5q. The shuttle ring 7, as shown by the arrow I in FIG. 3, can be rotated freely relative to the controller body 4. Because the shuttle ring 7 is transparent, it is possible to view therethrough graphics and characters or the like displayed by the display devices 5b to 5q disposed therebelow. If the shuttle ring 7 is rotated to the left or to the right, switching is made, for example, to a mode that selects an apparatus 2 such as a video tape recorder, a CD player, or a DVD player or the like, whereupon graphics or characters corresponding to that mode are displayed by the display devices 5a to 5q.

Figure 8B:
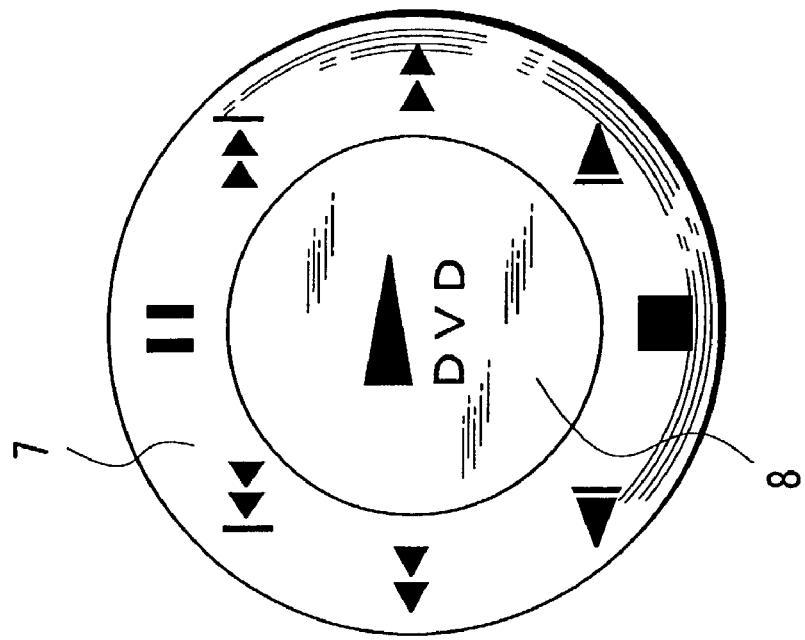
FIG. 8B is a drawing illustrating that the placement of the operating buttons displayed by the display devices does not change if the shuttle ring is rotated, this view showing the shuttle ring after it is rotated to the right.
Figure 8A:
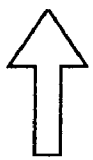
FIG. 8A is drawing illustrating that the placement of the operating buttons displayed by the display devices does not change if the shuttle ring is rotated, this view showing the case of rotating the shuttle ring to the right.
Figure 8A:
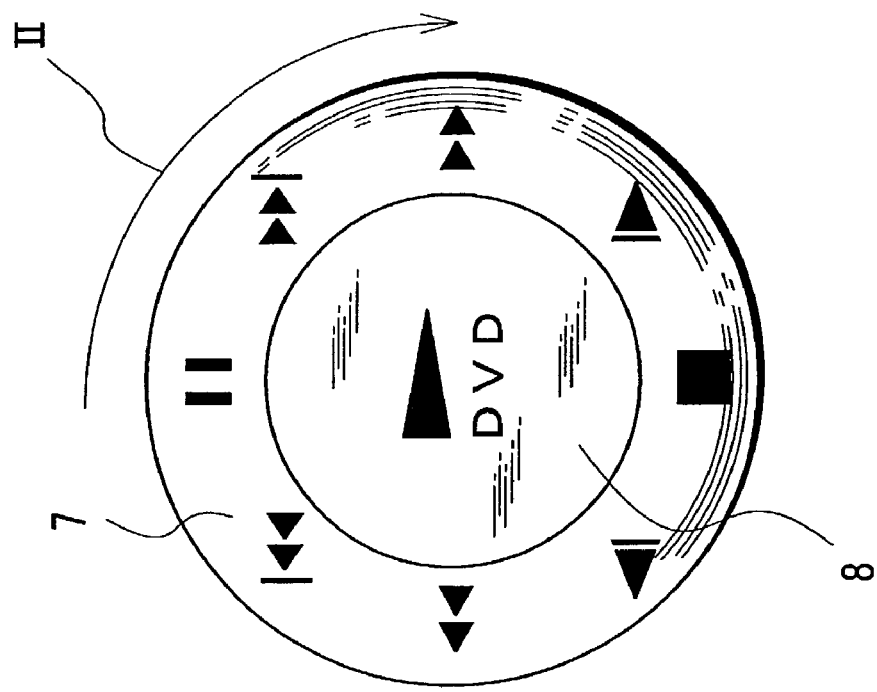
Figure 9B:
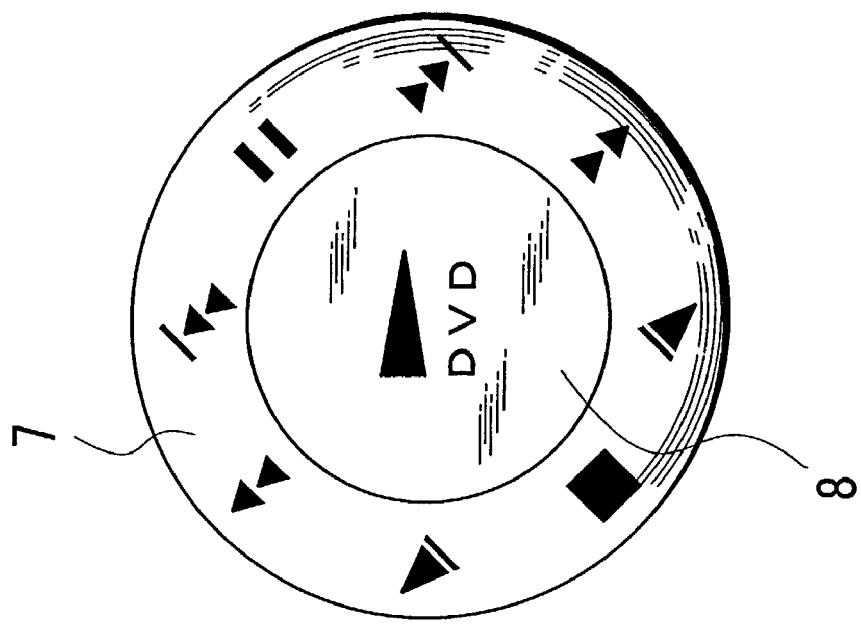
FIG. 9B shows an example in which the display devices are disposed on the front surface of the shuttle ring, in which case the orientation of the operating buttons changes with rotation of the shuttle ring, this view showing the shuttle ring after it is rotated to the right.
Figure 9A:
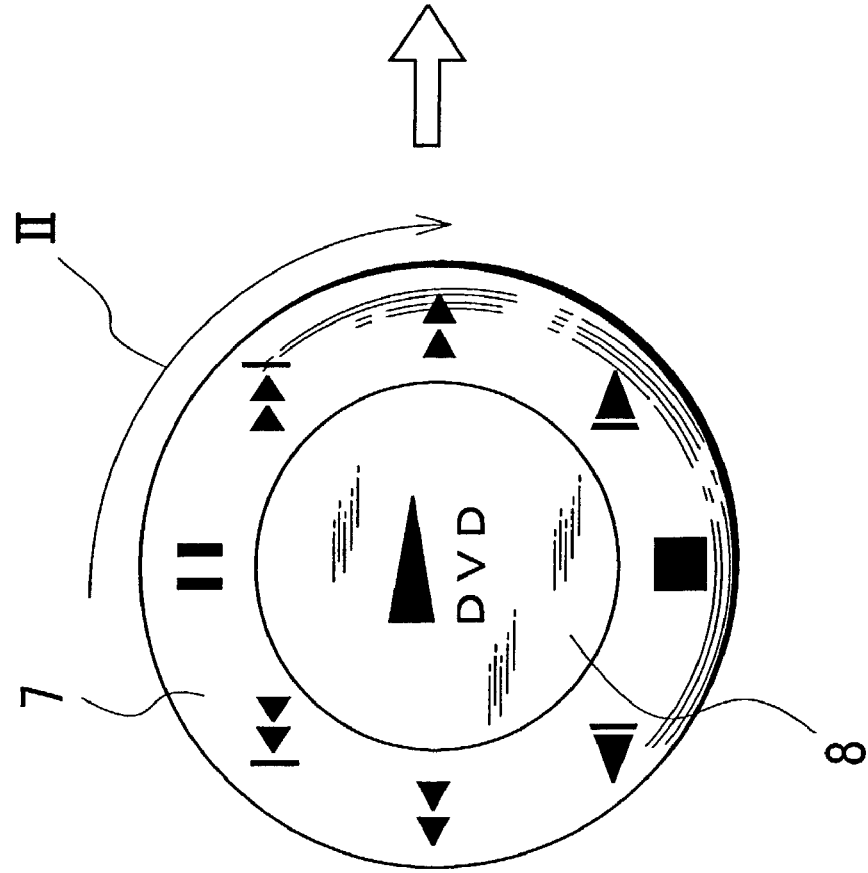
FIG. 9A shows an example in which the display devices are disposed on the front surface of the shuttle ring, in which case the orientation of the operating buttons changes with rotation of the shuttle ring, this view showing the case of rotating the shuttle ring to the right.
Figure 10B:
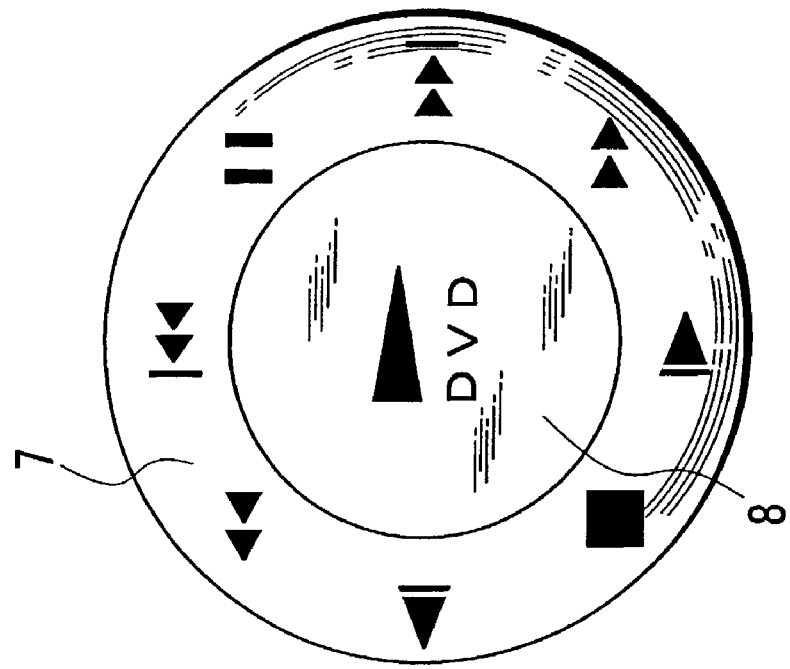
FIG. 10B is a drawing illustrating the changing of the display positions of the operating button responsive to rotation of the shuttle ring, this view showing the shuttle ring after it is rotated to the right.
Figure 10A:
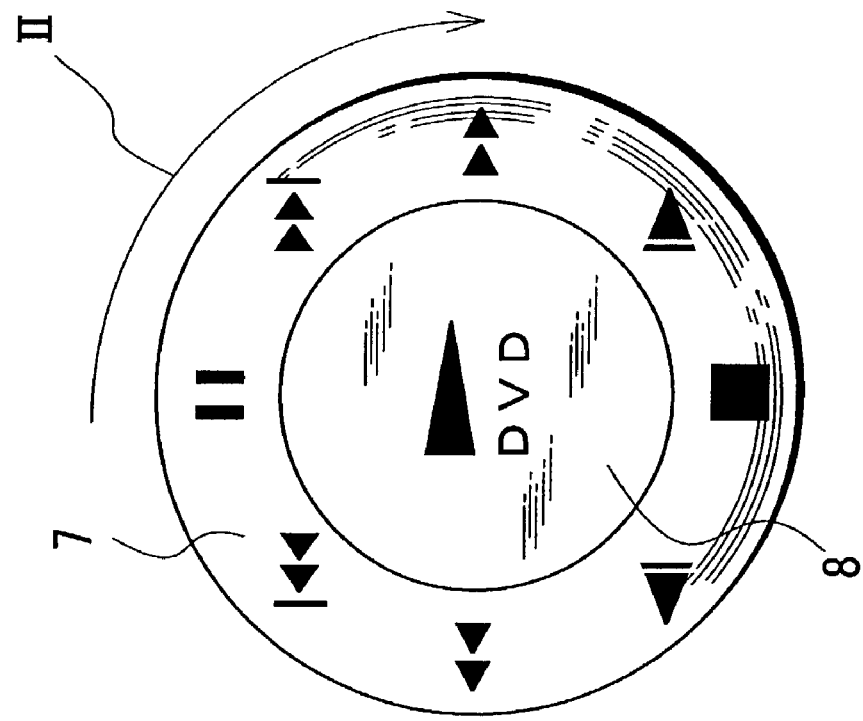
FIG. 10A is a drawing illustrating the changing of the display positions of the operating button responsive to rotation of the shuttle ring, this view showing the case of rotating the shuttle ring to the right.
Figure 11:
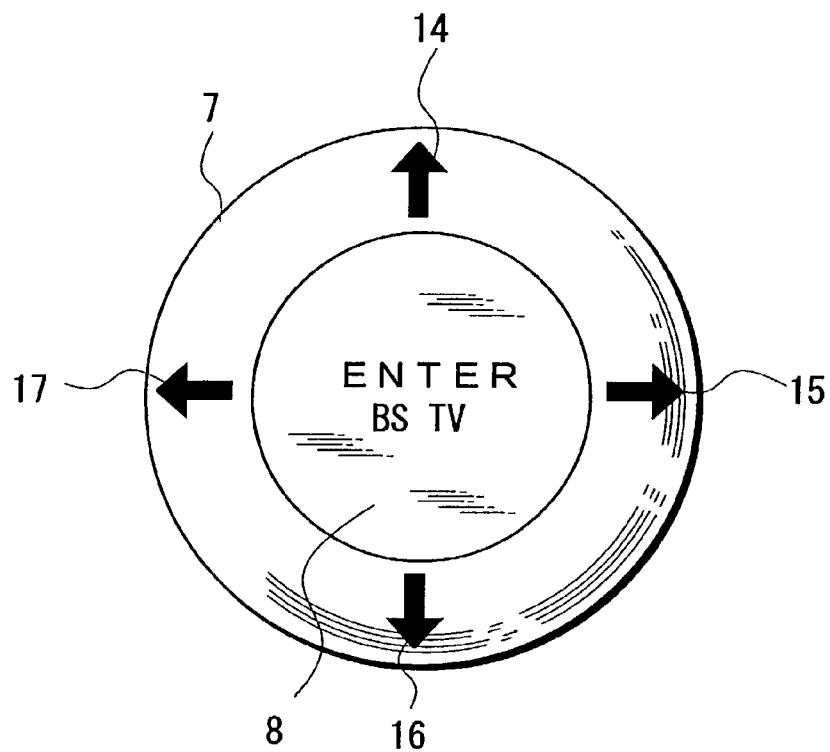
FIG. 11 is a drawing showing an example of a display of BS television tuner operating buttons.

In this manner, by disposing the display devices 5b to 5q below the transparent shuttle ring 7, even in the case, for example, in which the shuttle ring 7 is rotated to the right, as shown by the arrow II in FIG. 8A, there is no change in the positions of the operating buttons (graphic displays serving as operating buttons) displayed by the display devices 5b to 5q disposed therebelow. If the display devices 5b to 5q are located on the surface of the shuttle ring 7, however, as shown in FIG. 9A and FIG. 9B, rotation of the shuttle ring 7 causes a change in the orientation of the operating buttons, making operating difficult. Although in the example shown in FIG. 8A and FIG. 8B, the operating buttons displayed by the display devices 5b to 5q are always displayed by the same display devices 5b to 5q, as shown in FIG. 10A and FIG. 10B, it is alternatively possible to cause the display positions of the operating button to rotate in accordance with rotation of the shuttle ring 7, in which case because the orientation of the operating buttons remains the same, there is no hindrance to operation.

The shuttle ring 7 is configured so as to stop at positions in accordance with intervals between the positions at which the display devices 5a to 5q are disposed, and provide a tactile detent click at these positions. It will be understood that the shuttle ring 7 can alternatively be configured so as to rotate smoothly with no such detents.

When the shuttle ring 7 is caused to rotate, a rotational movement amount detector 66 provided on the controller body 4 detects the rotation of the shuttle ring 7, and switches the content displayed by the display devices 5a to 5q in accordance with the amount of rotation of the shuttle ring 7. When the rotational movement amount detector 66 detects rotation of the shuttle ring 7, part of the content displayed by the annularly disposed display devices 5b to 5q is switched so as to be displayed by the center display device 5a, responsive to the rotation of the shuttle ring 7.

Although the shuttle ring 7 can be made of a hard, transparent plastic material, it can also be formed as a soft, resilient, transparent resin member, in which case it is particularly easy to press the operating switches 6a to 6q, to be described below.

The center button 8, as shown in FIG. 3 and FIG. 4, is a transparent disc-shaped button, disposed above the display device 5a, which is disposed at the center. The center button 8 is provided facing a center hole 13 of the shuttle ring 7 and, in contrast to the shuttle ring 7, is mounted to the controller body 4 so as to not be rotatable. This center button 8, similar to the shuttle ring 7, is formed as a hard, transparent plastic or resilient, transparent resin member. If the center button 8 is formed as a soft resin member, it is easy to press the center button 8.

The transmitting/receiving section 10 can perform uni-directional or bi-directional communication so as exchange signals between the remote controller apparatus 1 and the apparatus 2. For example, in the case in which uni-directional communication is done from the controller body 4 to the apparatus 2, remote control signals output by pressing the operating buttons displayed by the display devices 5a to 5q are sent to the apparatus 2 from the transmitting/receiving section 10 of the remote controller apparatus 1. In the case of bi-directional communication, image display position data (key assignment data) having display image numbers (display numbers) for establishing which graphics are to be assigned to each of the display devices 5a to 5q, and image data stored in a memory 53 (refer to FIG. 7) of the apparatus 2 are sent to the transmitting/receiving section 10 of the remote controller apparatus 1 from the apparatus 2, and remote control signals output by pressing the operating buttons displayed by the display devices 5a to 5q are sent to the apparatus 2 from the transmitting/receiving section 10 of the remote controller apparatus 1. This function setting data (image data and position specifying information for displaying the image data by the display devices) sent and received between the remote controller apparatus 1 and the apparatus 2 will be described in further detail below.

The memory 11 stores graphics and characters indicating the type of apparatus 2, or image data for graphics or characters in accordance with the apparatus 2. Image data and characters stored in the memory 11 will be described by examples below.

Figure 12:
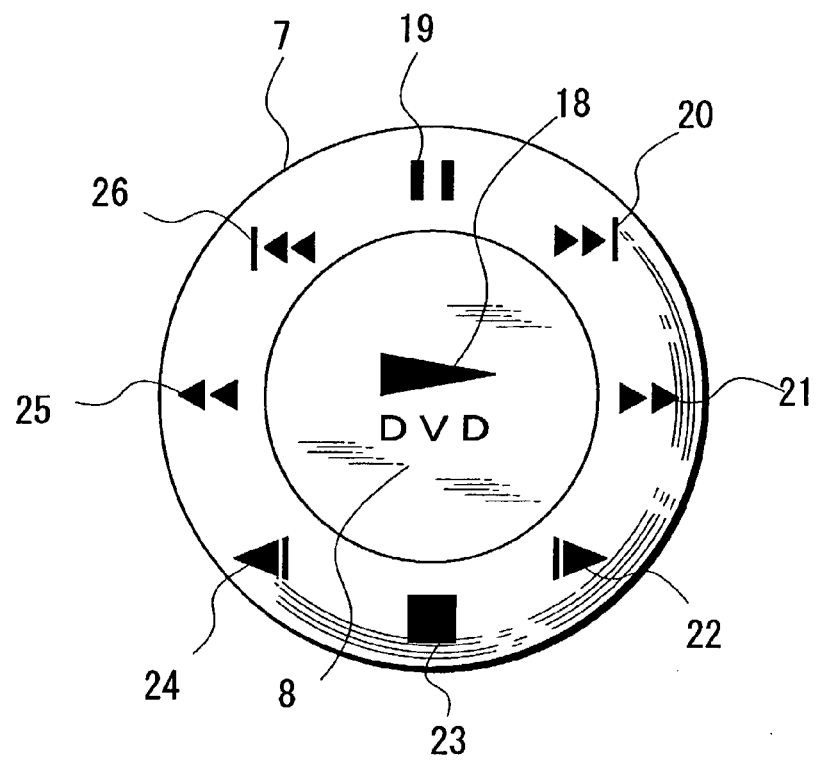
FIG. 12 is a drawing showing an example of a display of DVD tuner operating buttons.

In a remote controller apparatus 1 configured as described above, the content displayed by the display devices 5a to 5q disposed below the shuttle ring 7 and below the center button 8 changes in accordance with the apparatus 2 being controlled. For example, as shown in FIG. 1, in the case of a BS television tuner, the characters "ENTER BS TV" is displayed at the center button 8, and up, down, left, and right direction buttons 14, 15, 16, and 17 are displayed on the shuttle ring 7. In the case of a DVD tuner, as shown in FIG. 12, the characters "DVD" and a playback button 18 are displayed at the center button 8, and on the shuttle ring 7, starting from the topmost position and proceeding in the clockwise direction, a pause button 19, a post-capture button 20, a fast forward button 21, a slow playback button 22, a stop button 23, a slow rewind/playback button 24, a rewind button 25, and a pre-capture button 26 are displayed.

Figure 13:
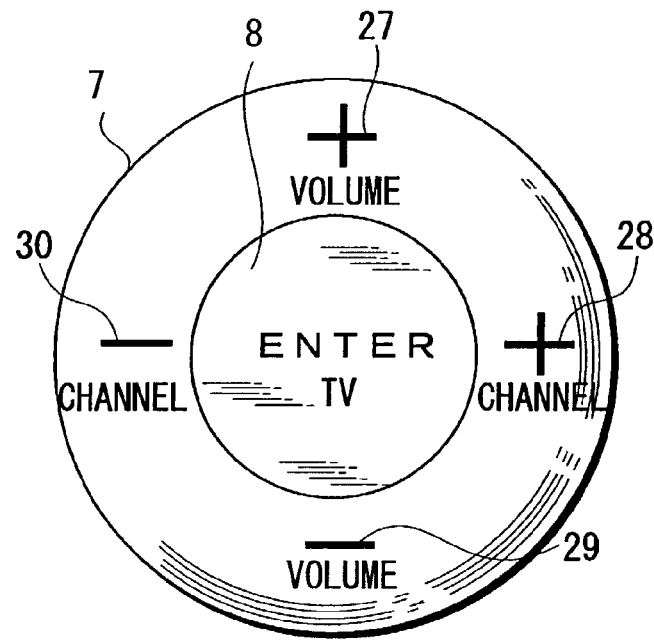
FIG. 13 is a drawing showing an example of a display of TV tuner operating buttons.

In the case of a TV tuner, as shown in FIG. 13, the characters "ENTER TV" are displayed at the center button 8, and on the shuttle ring 7, starting from the topmost position and proceeding in the clockwise direction, the characters "VOLUME" and a plus button 27 for increasing the volume, the characters "CHANNEL" and a plus button 28 for increasing the channel number, the characters "VOL- UME" and a minus button 29 for decreasing the volume, and the characters "CHANNEL" and a minus button 30 for decreasing the channel number are displayed.

Figure 14:
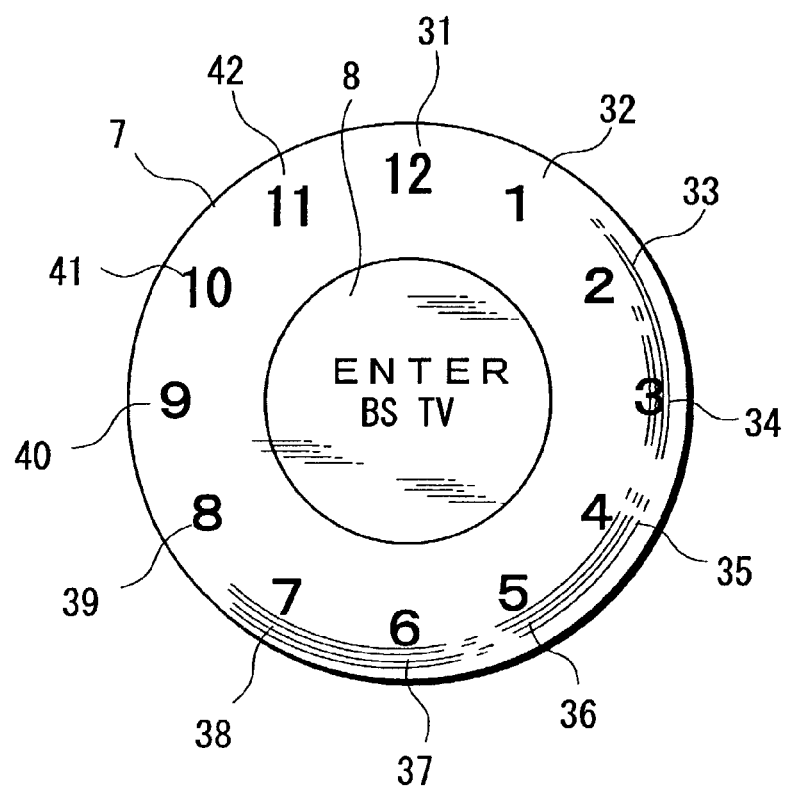
FIG. 14 is a drawing showing an example of a display of BS television tuner operating buttons.

In another case of a BS television tuner, as shown in FIG. 14, the characters "ENTER BS TV" are displayed at the center button 8, and on the shuttle ring 7, starting from the topmost position and proceeding in the clockwise direction, a channel 12 button 31, a channel 1 button 32, a channel 2 button 33, a channel 3 button 34, a channel 4 button 35, a channel 5 button 36, a channel 6 button 37, a channel 7 button 38, a channel 8 button 39, a channel 9 button 40, a channel 10 button 41, and a channel 11 button 42.

Figure 15:
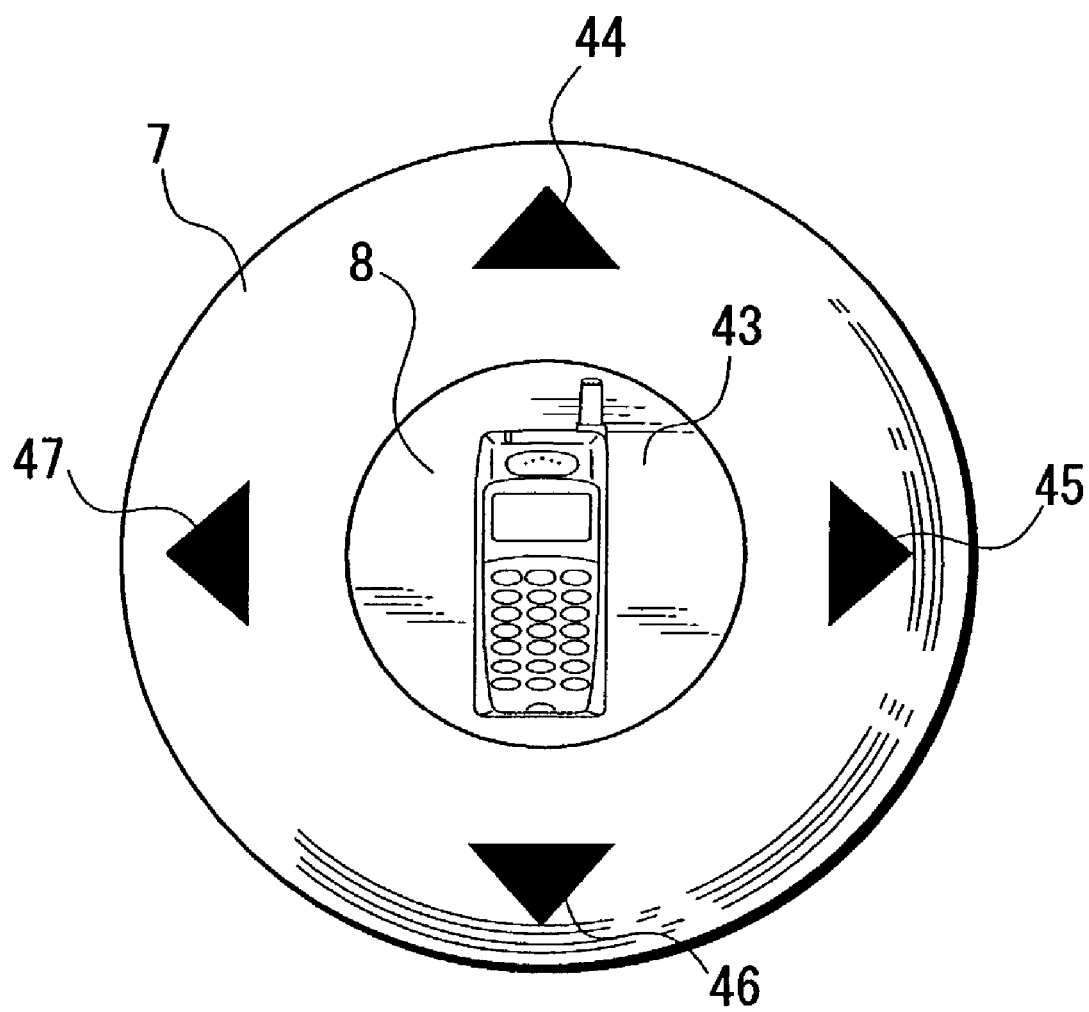
FIG. 15 is a drawing showing an example of a display of operating buttons of a mobile telephone terminal.

In the case of a mobile telephone terminal apparatus, as shown in FIG. 15, a mobile telephone button 14 with the design of a mobile telephone terminal apparatus is displayed at the center button 8, and on the shuttle ring 7, starting from the topmost position and proceeding in the clockwise direction, a top operating button 44, a right operating button 45, a bottom operating button 46, and a left operating button 47 are displayed.

Configuration of the Controlled Apparatus

FIG. 7 shows a conceptual block diagram of a DVD, which is an example of the apparatus 2. The DVD player has a servo circuit 48 with a tracking servo and a focus servo and the like, a signal processing circuit 49 for processing video signals and audio signals, a display drive circuit 51 for displaying various information on a liquid-crystal display 50 (refer to FIG. 1), various operating switches 52 (refer to FIG. 1), a memory 53, a transmitting/receiving section 54, and a CPU 55, which controls these elements.

Example of Remote Control of the Controlled Apparatus

Figure 16:
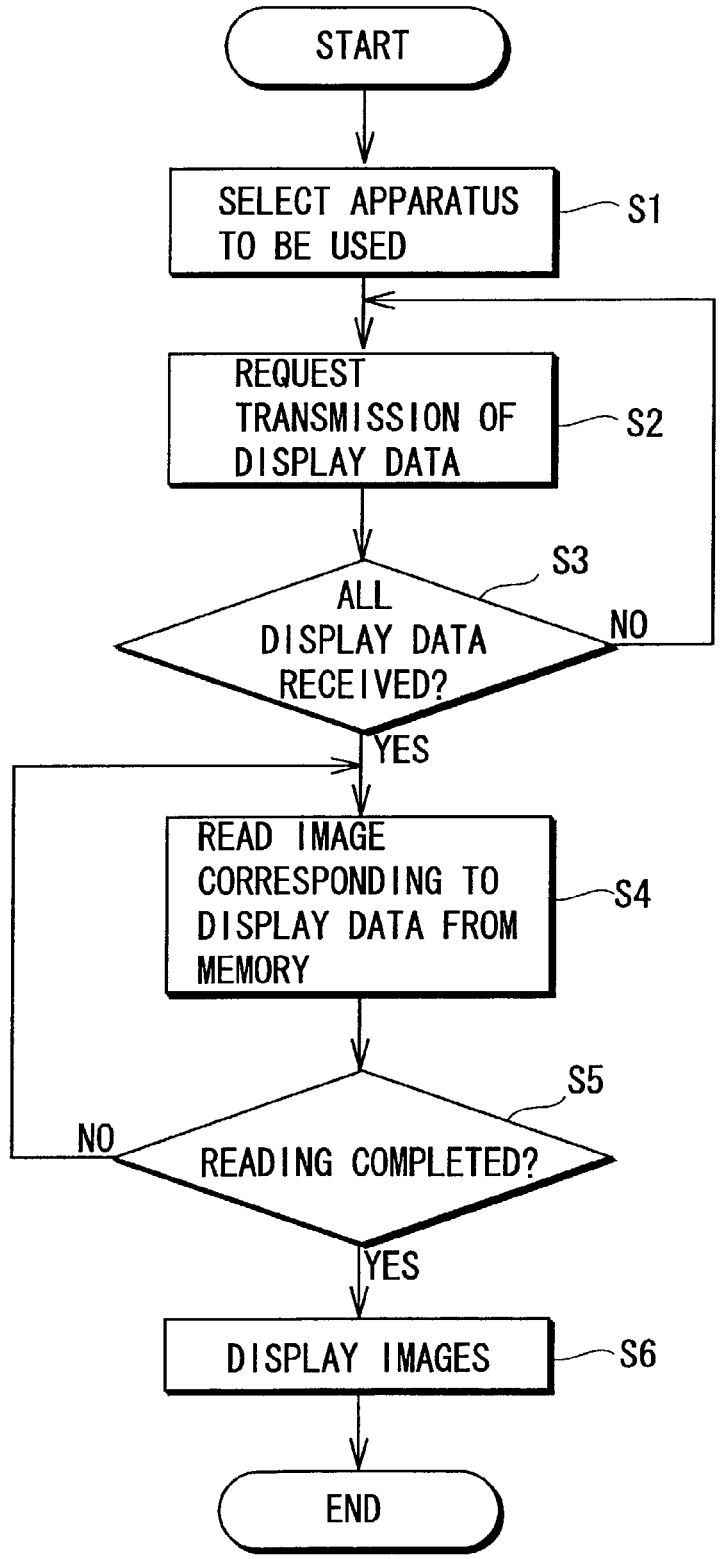
FIG. 16 is a flowchart showing the flow from apparatus selection to display of images on the display devices.

FIG. 16 shows a flowchart of the operations starting from the selection of the apparatus to be controlled from various apparatuses 2, up until the display of images on the display devices 5a to 5q of the remote controller apparatus 1. First, as the processing of step S1, a user selects the apparatus 2 to be controlled (used). In this case, selection is made from a TV tuner, a video tape recorder, a DVD player, and an apparatus connected to a home network or the Internet. That is, as shown in FIG. 17, pressing one of the buttons 56, 57, 58, and 59 displayed around the shuttle ring 7 makes the selection.

Figure 17:
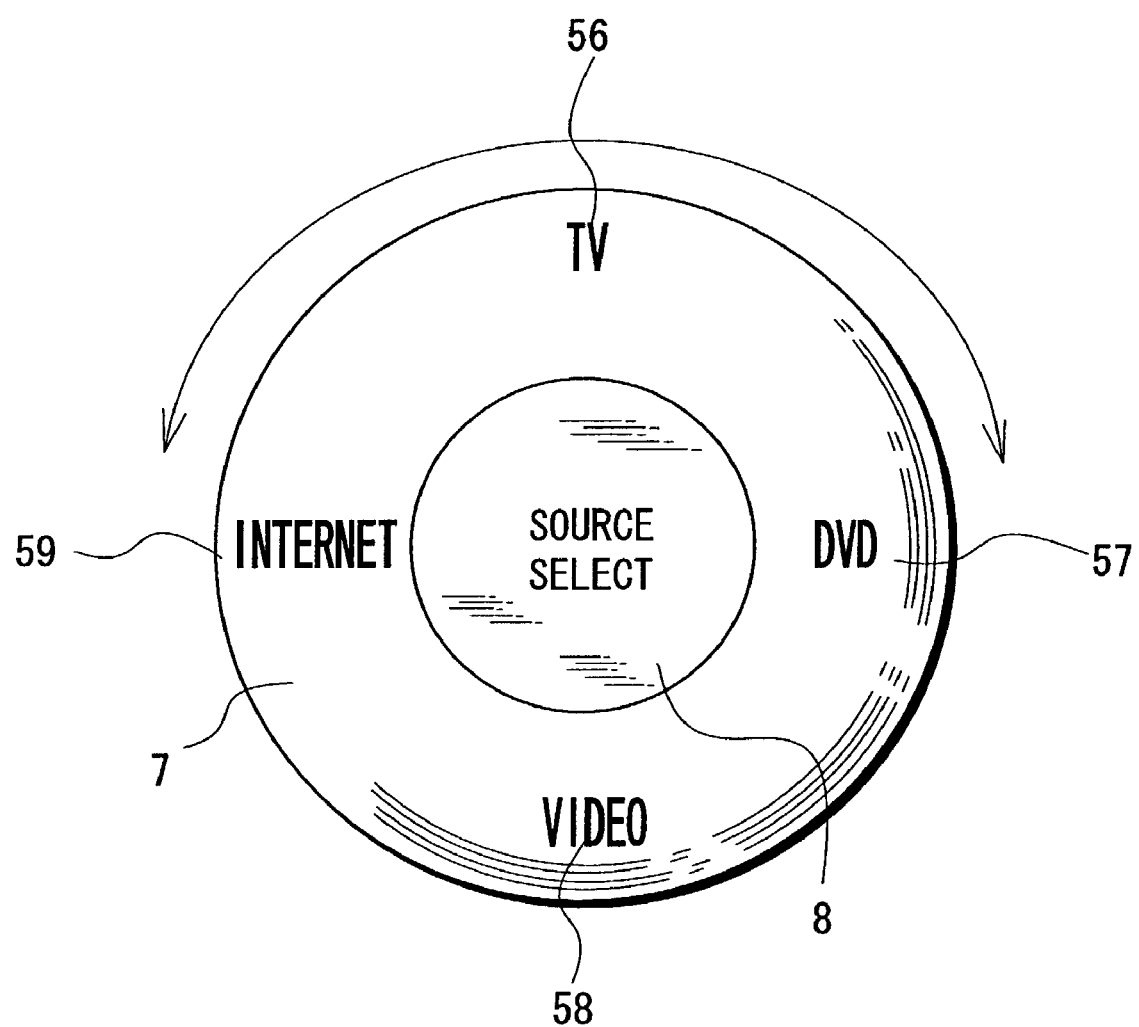
FIG. 17 is a drawing showing a condition in which operating buttons for apparatus selection are displayed on the shuttle ring.

In the example of FIG. 17, the characters "SOURCE SELECT" are displayed at the display device 5a having display number 00, the characters "TV" are displayed at the display device 5b having the display number 01, the characters "DVD" are displayed at the display device 5f having the display number 05, the characters "VIDEO" are displayed at the display device 5j having the display number 09, and the characters "INTERNET" are displayed at the display device 5n having the display number 13. The apparatus to be used is selected from these, and the part of the shuttle ring 7 at which the corresponding characters are displayed (that is, operating button 56, 57, 58, or 59) is pressed. In this example, the shuttle ring 7 serves as direct buttons for each of the apparatuses 2.

Figure 18B:
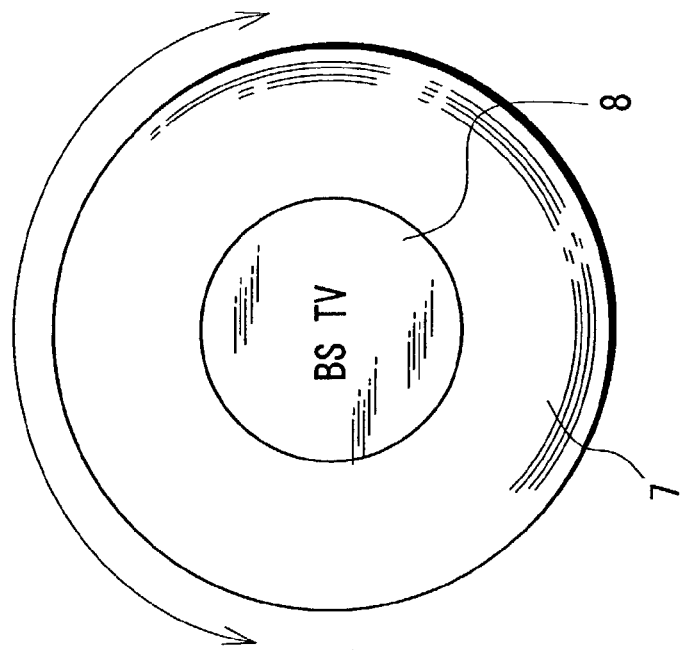
FIG. 18B is a drawing illustrating the rotation of the shuttle ring so as to selected a desired apparatus, this view showing the condition in which the BS tuner is selected.
Figure 18A:
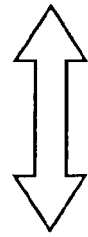
FIG. 18A is a drawing illustrating the rotation of the shuttle ring so as to selected a desired apparatus, this view showing the condition in which the DVD tuner is selected.
Figure 18A:
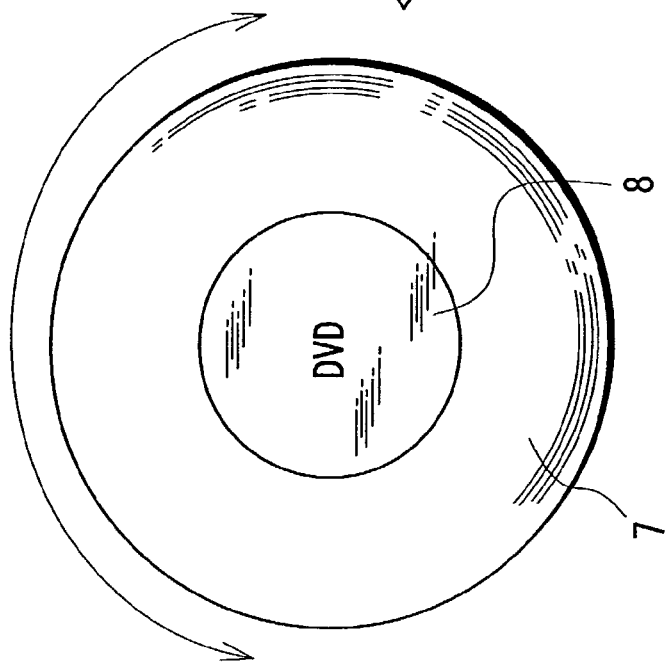

In addition to the above, it is possible as shown in FIG. 18A and FIG. 18B to cause the shuttle ring 7 to rotate so as to select the desired apparatus 2, at which point the center button 8 is pressed to finalize the selection. In this example, when the shuttle ring 7 is rotated, the display changes from the condition shown in FIG. 18A, in which the characters "DVD" are displayed, to the condition shown in FIG. 18B, in which the characters "BS TV" are displayed. The apparatus 2 to be used is selected from these, and the center button 8 displaying the corresponding characters is pressed.

In the case of using a DVD player, the center button 8 is pressed when the characters "DVD" are displayed at the center button 8 by rotating the shuttle ring 7.

When selection button for selecting the apparatus 2 is pressed, the CPU 12 sends an apparatus selection signal from the transmitting/receiving section 10 to the apparatus 2 to be used. In the case in which the main power supply of the apparatus 2 is switched off at this point, the main power is automatically switched on. Next, as the processing of step S2, the CPU 12 requests transmission of image display position data, which is position specifying information for images and the like assigned to each of the display devices 5a to 5q with respect to the apparatus 2 to be used.

The image display position data is, for example as shown in FIG. 19, display numbers in the form of a two-digit numbers (display position numbers of the display devices 5a to 5q shown in FIG. 5) and image display numbers in the form of three-digit numbers corresponding to the display numbers. This image display position data is stored in the memory 53 of the apparatus 2.

Examples of correspondences between image display numbers and display numbers, the image having the image display number 037 corresponds to the display device 5a having the display number 00 (which image is described further below with reference to FIG. 20), the image having the image display number 030 corresponds to the display device 5b having the display number 01, the image having the image display number 000 corresponds to the display device 5c having the display number 02, the image having the image display number 034 corresponds to the display device 5d having the display number 03, the image having the image display number 000 corresponds to the display device 5e having the display number 04, the image having the image display number 036 corresponds to the display device 5f having the display number 05, the image having the image display number 000 corresponds to the display device 5g having the display number 06, the image having the image display number 032 corresponds to the display device 5h having the display number 07, and the image having the image display number 000 corresponds to the display device 5i having the display number 08.

In the same manner, the image having the image display number 029 corresponds to the display device 5j having the display number 09, the image having the image display number 000 corresponds to the display device 5k having the display number 10, the image having the image display number 031 corresponds to the display device 5l having the display number 11, the image having the image display number 000 corresponds to the display device 5m having the display number 12, the image having the image display number 035 corresponds to the display device 5n having the display number 12, the image having the image display number 000 corresponds to the display device 5o having the display number 14, the image having the image display number 000 corresponds to the display device 5p having the display number 15, and the image having the image display number 000 corresponds to the display device 5q having the display number 16.

Upon receiving the display data list of the image display position data shown in FIG. 19 (step S3), the CPU 12 of the remote controller apparatus 1 proceeds to step S4, but if reception is not made, return is made to step S2. As the processing of step S4, based on the display list data sent to the remote controller apparatus 1, the CPU 12 reads from the memory 11 of the remote controller apparatus 1 images to be displayed by the display devices 5a to 5q.

Figure 20:
FIG. 20 shows a list of image data stored in the memory of the remote controller apparatus, this view showing image display numbers and the images corresponding thereto.

As shown in FIG. 20, this data is made up of image display numbers in the form of three-digit numbers, and images (numerals, characters, and symbols or the like) corresponding to this image display numbers. For example, assignments are made so that there is nothing displayed at the image display number 000, numbers from 1 to 12, indicating track numbers or channel numbers are assigned to the image display numbers 001 to 012, the characters "ENTER TV" are displayed at the image display number 013, an upward-pointing arrow representing an up key is assigned to the image display number 014, a downward-pointing arrow representing a down key is assigned to the image display number 015, a left-pointing arrow representing a left key is assigned to the image display number 016, a right-pointing arrow representing a right key is assigned to the image display number 017, the characters "ENTER BS TV" are assigned to the image display number 018, an upward-pointing triangle representing an up key is assigned to the image display number 019, a downward-pointing triangle representing a down key is assigned to the image display number 020, a left-pointing triangle representing a left key is assigned to the image display number 021, and a right-pointing triangle is assigned to the image display number 022.

In the same manner, a mobile telephone symbol is assigned to the image display number 023, the characters "CHANNEL" and a plus sign for channel selection are assigned to the image display number 024, the characters "CHANNEL" and a minus sign for channel selection are assigned to the image display number 025, the characters "VOLUME" and a plus sign for volume adjustment are assigned to the image display number 026, the characters "VOLUME" and a minus sign for volume adjustment are assigned to the image display number 027, the characters ENTER and the plus and minus signs are assigned to the image display number 028, a square symbol meaning stop is assigned to the image display number 029, a double vertical-line symbol meaning pause is assigned to the image display number 030, a left-pointing triangle with a vertical slit, meaning slow rewind is assigned to the image display number 031, a right-pointing triangle with a vertical slit, meaning slow playback is assigned to the image display number 032, two right-pointing triangles with one vertical line, meaning pre-capture, are assigned to the image display number 033, two left-pointing triangles with one vertical line, meaning post-capture, are assigned to the image display number 034, two left-pointing triangles meaning rewind are assigned to the image display number 035, two right-pointing triangles meaning fast forward are assigned to the image display number 036, the characters "DVD" and a right-pointing arrow meaning playback are assigned to the image display number 037, the characters "EJECT" and an upward-pointing triangle with one horizontal line are assigned to the image display number 038, and a circle meaning record is assigned to the image display number 039.

In this manner, the memory 11 of the remote controller apparatus 1 stores the display data for all the operating buttons that are envisioned for various types of apparatuses 2, such as a DVD player, a CD player, or a mobile telephone that is connectable to the Internet. This image data, made up of numbers, characters, and symbols and the like, is read out from the memory 11 based on image display position data sent from the apparatus 2. When all the image data cited as image display position data has been read from the memory 11 (step S5), the CPU 12, as the processing of step S6, displays the images at each of the display devices 5a to 5q.

If all of the data had not been read at the test performed by step S5, the CPU 12 repeats the processing of step S4.

The reading out of image data to each of the display devices 5a to 5q in accordance with the list of image display position data shown in FIG. 19 is performed as follows. At the display device 5a having the display number 00, the DVD playback operating button having the image display number 037 is displayed, at the display device 5b having the display number 01, a pause button having the image display number 030 is displayed, at the display device 5c having the display number 02 nothing is displayed in accordance with the image display number 000, at the display device 5d having the display number 03 a next capture button having the image display number 034 is displayed, at the display device 5e having the display number 04 nothing is displayed in accordance with the image display number 000, at the display device 5f having the display number 05 a fast-forward button having the image display number 036 is displayed, at the display device 5g having the display number 06 nothing is displayed in accordance with the image display number 000, at the display device 5h having the display number 07 a slow playback button having the image display number 032 is displayed, and at the display device 5i having the display number 08 nothing is displayed in accordance with the image display number 000.

Similarly, at the display device 5j having the display number 09 a stop button having the image display number 029 is displayed, at the display device 5k having the display number 10 nothing is displayed in accordance with the image display number 000, at the display device 5l having the display number 11 a slow rewind/playback button having the image display number 031 is displayed, at the display device 5m having the display number 12 nothing is displayed in accordance with the image display number 000, at the display device 5n having the display number 13 a rewind button having the image display number 035 is displayed, at the display device 5o having the display number 14 nothing is displayed in accordance with the image display number 000, at the display device 5p having the display number 15 a pre-capture button having the image display number 033 is displayed, and at the display device 5q having the display number 16 nothing is displayed in accordance with the image display number 000.

In this manner, in the remote controller apparatus 1 according to the above-described embodiment of the present invention, image display position data formed by a listing of image display number to which are assigned images for display by the display devices 5a to 5q are received from the apparatus 2 and, based on the received data list, image data in accordance to the data list is read from the memory 11 of the remote controller apparatus 1, and displayed as operating buttons on the shuttle ring 7 and the center button 8 by each of the display devices 5a to 5q, thereby enabling all of the operating buttons of the apparatus 2 to be displayed on the shuttle ring 7 and the center button 8, eliminating the need for the user to be concerned about what operating button corresponds to which operation.

Furthermore, using the remote controller apparatus 1 because only the operating buttons for the particular apparatus 2 being controlled are displayed on the shuttle ring 7 and center button 8, it is not necessary to assign a plurality of operations to one button to accommodate each type of apparatus 2, thereby avoiding an increase in the number of operating buttons and enabling efficient operation with a small number of operating buttons.

Using the remote controller apparatus 1 according to this embodiment of the present invention, because bi-directional communication is performed with the apparatus 2, it is possible to change the content displayed by the display devices 5a to 5q responsive to various characteristics of one and the same source apparatus, for example, in the two cases of recording and playback using a video tape recorder.

Although the foregoing embodiment is described for the case in which the controlled apparatus is a DVD player, it will be understood that it similarly possible in the case in which the apparatus 2 controlled by the remote controller apparatus 1 is an apparatus such as a TV tuner, a video tape recorder, CD player, or an apparatus connected to a home network or the Internet, to display only the operating buttons for that particular apparatus 2 on the shuttle ring 7 and center button 8, thereby preventing misoperation.

It will be further understood that the remote controller apparatus 1 of the above-noted embodiment not only displays on the shuttle ring 7 and the center button 8 operating buttons for a video game machine or apparatus connected to a network, but can also display on the shuttle ring 7 and the center button 8 operating buttons for the purpose of operating an application program executed by the video game machine or network-connected apparatus.

Another Embodiment

In the embodiment described above, image display position data and image data for operating buttons is sent from the apparatus 2 in response to a request from the remote controller apparatus 1. In addition to this data, it is possible to make an embodiment of the present invention in which audio data is also transmitted to the remote controller apparatus 1. If audio data is transmitted to the remote controller apparatus 1, it is possible for example to have a user recognize when he or she has selected a particular button by means of a sound, thereby providing a further improvement in added value.

In this embodiment of the present invention, force feedback data which imparts vibration to the hand holding the remote controller apparatus 1 can be used as data for a function setting sent to the remote controller apparatus 1. If this is done, it is necessary to provide in the controller body 4 a responding means such as a vibrating mechanism or the like, which receives the force feedback data and imparts a vibration to the controller body 4.

If this configuration is adopted, for example, if an operating button is pressed a vibrating mechanism provided in the controller body 4 operates, the controller body 4 vibrates, this vibration informing the user operating the remote controller apparatus 1 that the input of the operating button has been made.

In this embodiment, bi-directional communication is possible between the remote controller apparatus 1 and the apparatus 2, but it is also possible in the case of uni-directional communication from the remote controller apparatus 1 to the apparatus 2. In the case of uni-directional communication, in contrast to the case of bi-directional communication, it is not necessary to send from the apparatus 2 the image display position data (refer to FIG. 19) making assignments of which images are to be displayed by which display devices 5a to 5q.

That is, using the remote controller apparatus 1 with uni-directional communication, when the apparatus 2 is selected, image data for the operating buttons of the apparatus 2 or for various operating buttons displayed by an application program executed by the apparatus 2, and image display position data specifying at which positions on the display devices 5a to 5q the image data is to be displayed are read from the memory 11 provided in the remote controller apparatus 1, and the read-out image data is displayed by the respective display devices 5a to 5q according to the image display position data. The images read from the memory 11 are priorly and uniquely assigned by the image display position data to positions among the display devices 5a to 5q.

While in the above-described embodiment the image data for operating button of all apparatuses 2 controlled by the remote controller apparatus 1 (data shown in FIG. 20) is stored in the memory 11 of the remote controller apparatus 1, it is alternately possible to store this image data in the apparatus 2.

FIG. 21 shows a list of image display position data for the purpose of assigning each of the image data to each of the display devices 5a to 5q, according to which list the characters "DVD" and a right-pointing triangle meaning playback are assigned to the display device 5a having the display number 00, a double vertical-line symbol meaning pause is assigned to the display device 5b having the display number 01, no display is assigned to the display device 5c having the display number 02, a single vertical line and two right-pointing triangles meaning pre-capture are assigned to the display device 5d having the display number 03, no display is assigned to the display device 5e having the display number 04, two right-pointing triangles meaning fast-forward are assigned to the display device 5f having the display number 05, no display is assigned to the display device 5g having the display number 06, a right-pointing triangle with a vertical slit meaning slow playback is assigned to the display device 5h having the display number 07, and no display is assigned to the display device 5i having the display number 08.

Similarly a square meaning stop is assigned to the display device 5j having the display number 09, no display is assigned to the display device 5k having the display number 10, a left-pointing triangle with a vertical slit meaning slow rewind is assigned to the display device 5l having the display number 11, no display is assigned to the display device 5m having the display number 12, two left-pointing triangles meaning rewind are assigned to the display device 5n having the display number 13, no display is assigned to the display device 5o having the display number 14, a single vertical line and two left-pointing triangles means post-capture are assigned to the display device 5p having the display number 15, and no display is assigned to the display device 5q having the display number 16.

In this manner, by imparting the image display position data for the purpose of assigning each of the image data to each of the display devices 5a to 5q to the apparatus 2, it is possible to freely customize the assignments of operating buttons in accordance with each of the apparatuses 2. That is, for a video tape recorder of a given manufacturer that has a double-speed playback function not found on the recorders of another manufacturer, it is possible to assign the associated double-speed playback button to an operating button as a direct button, and to cause the display devices 5a to 5q to display an image representing the double-speed playback button. In short, even in the case of an apparatus 2 having a special function, it is possible to assign to the remote controller apparatus 1 an operating button that controls the special function.

Figure 22:
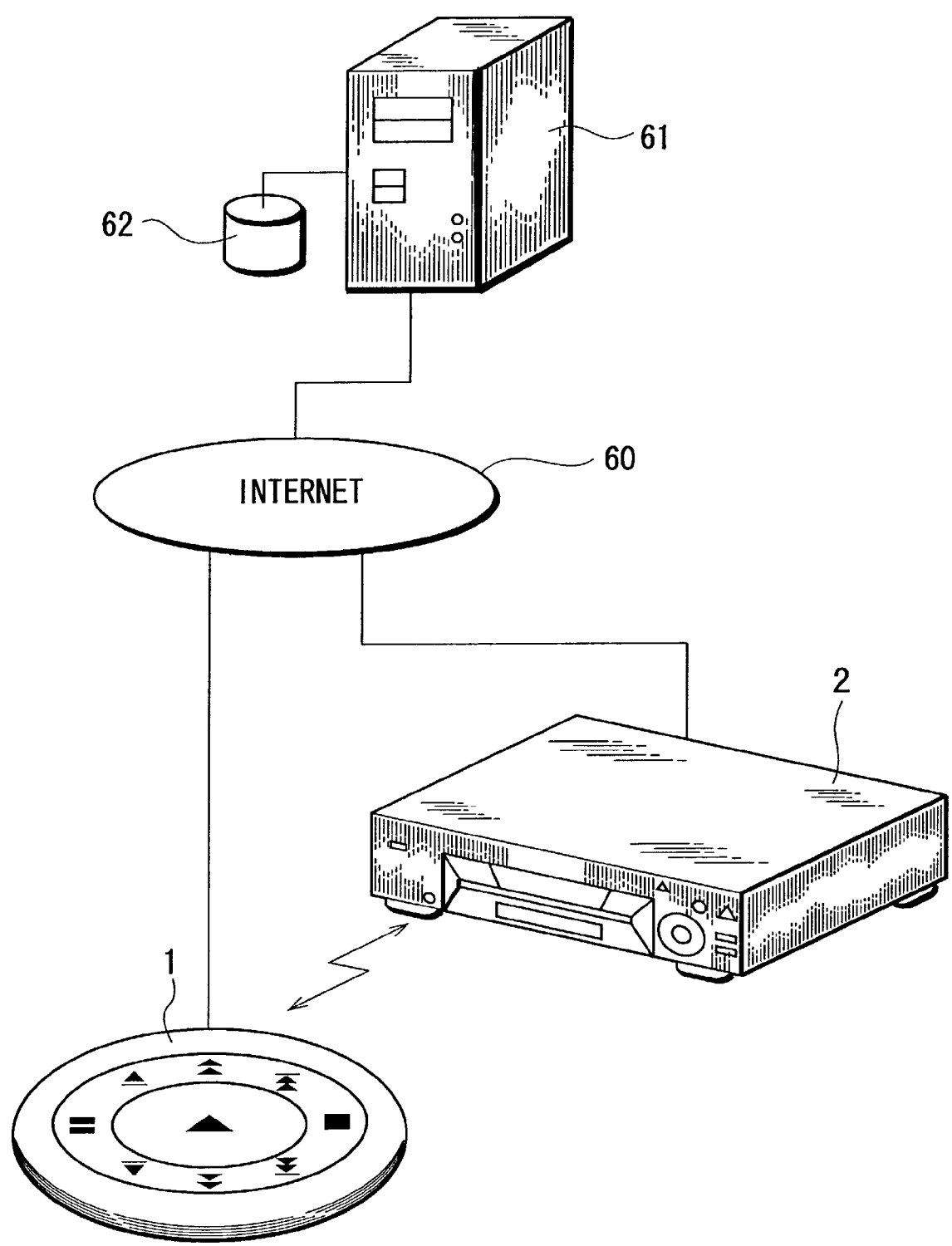
FIG. 22 is a drawing showing an example of downloading image display position data from the Internet to a remote controller apparatus or apparatus.

It is alternatively possible, rather than imparting the image display position data for assigning each of the image data to each of the display devices 5a to 5q, as shown in FIG. 22, to connect the remote controller apparatus 1 and the apparatus 2 to the Internet 60, for example, and to store the image display position data in an storage apparatus 62 of a server 61 connected to Internet 60 beforehand, and to download the image display position data to the remote controller apparatus 1 and the apparatus 2 via the Internet 60.

Thus, by downloading the image display position data via the Internet, compared to the case in which the image display position data is given to the remote controller apparatus 1 and the apparatus 2, it is possible not only to display images for more types of apparatuses, but also to facilitate switching of the images. It is further possible to download only the image data for operating buttons and the like to the remote controller apparatus 1 and the apparatus 2 via the Internet 60.

While the above example is that of downloading via the Internet 60, it will be understood that the downloading of image data and image display position data to the remote controller apparatus 1 and the apparatus 2 can also be done via a different type of network, such as a home network.

Figure 23:
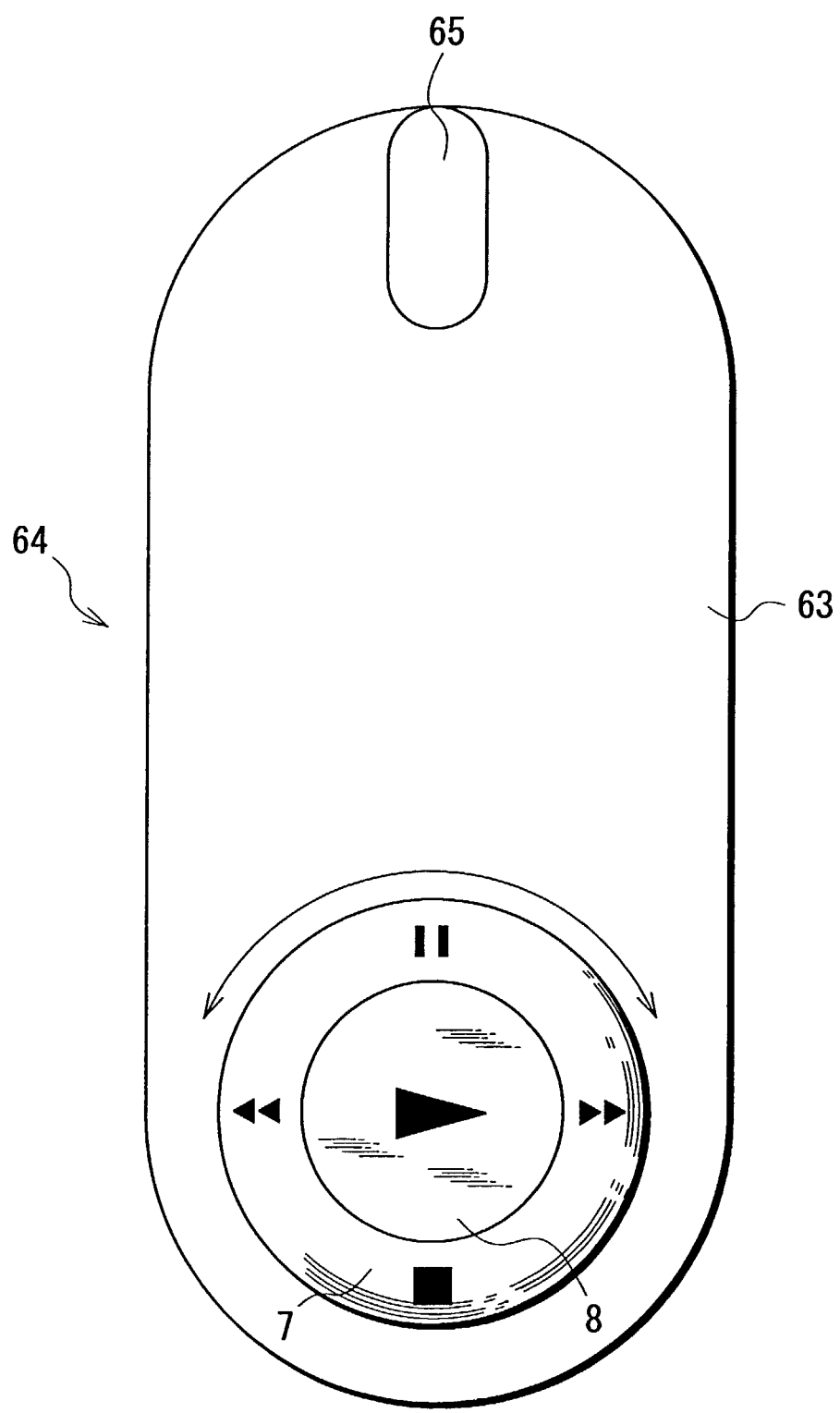
FIG. 23 is a drawing showing another embodiment of a remote controller apparatus according to the present invention, in which the shape of the controller body has been formed by vertically extending the circular shape.

Additionally, although the remote controller apparatus 1 in the above-noted embodiments has a controller body 4 having a shape similar to that of an egg cut vertically, the present invention is not restricted to this shape, and can take on a various other forms. For example, as shown in FIG. 23, it is possible to have a remote controller apparatus 64 with a controller body 63, which has been formed by vertically extending a circular shape, with the shuttle ring 7 and center button 8 provided in the region of one end thereof. The remote controller apparatus 64 can be held in and operated by one hand, and can also be placed on the top of a desk or table and operated. A transmitting/receiving section 65 is provided at an end of the vertically elongated controller body 63.

Figure 24:
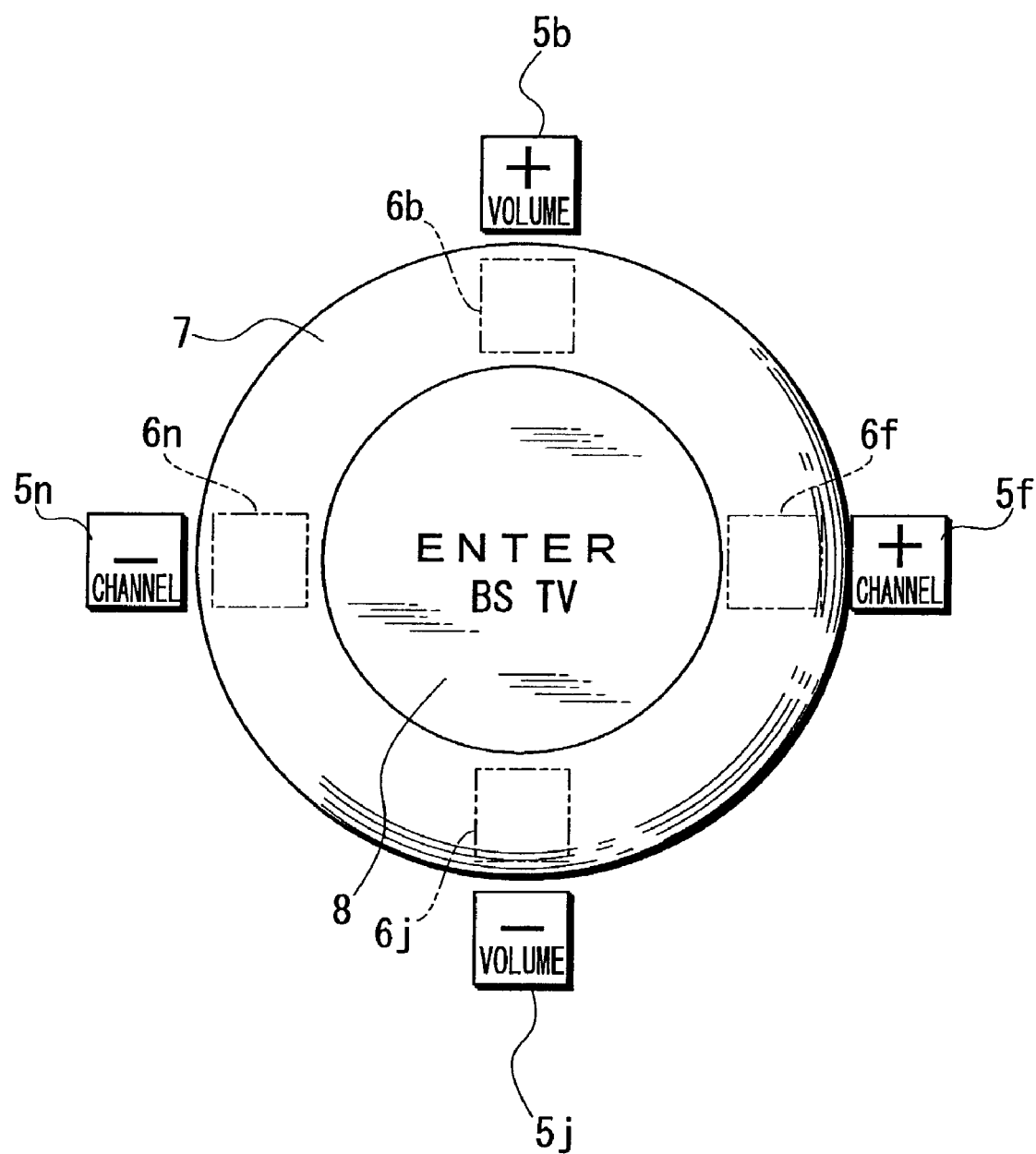
FIG. 24 is a drawing showing yet another embodiment of a remote controller apparatus according to the present invention, in which the display devices are disposed on the outside of the shuttle ring.

Although the remote controller apparatus 1 of the above-noted embodiments has operating switches 6a to 6q disposed below the display devices 5a to 5q, it is alternatively possible to have the display devices 5a to 5q and the operating switches 6a to 6q disposed separately. For example, as shown in FIG. 24, it is possible to have the display devices 5b, 5f, 5j, and 5n disposed to the outside of the shuttle ring 7.

What is claimed is:

1. A controller apparatus for controlling an electronic apparatus comprising:
    a first manipulatable unit comprising one or more display means, each of which displays an image relating to a function executable on at least one of the controller apparatus or the electronic apparatus which is controllable by the controller apparatus, a first manipulatable means capable of being manipulated in a first direction, a first detect means for detecting operation on the first manipulatable means by user and a first outputting means for outputting a signal for executing a function corresponding to the image selected by the detected operation;
    a second manipulatable unit arranged on the first manipulatable unit, that comprises a second manipulatable means capable of being manipulated in a second direction which is different from the first direction, a second detect means for detecting operation on a second manipulatable means by a user and a second outputting means which outputs a signal for executing a function corresponding to the image selected by the detected operation; and
    a communication unit that transmits to the electronic apparatus the signal output from at least one of the first manipulatable unit and the second manipulatable unit.

2. The controller apparatus according to claim 1, wherein:
    the communication unit receives from the electronic apparatus which is controllable by the controller apparatus a function setting data for enabling execution of a function of at least one of the controller apparatus or the electronic apparatus.

3. The controller apparatus according to claim 1, wherein the image data is downloaded via a network.

4. The controller apparatus according to claim 1, wherein at least one of the first and second manipulatable means is disposed below the display means.

5. The controller apparatus according to claim 1, wherein each of the display means are separate units.

6. The controller apparatus according to claim 1, wherein each of the display means are connected to each other.

7. The controller apparatus according to claim 1, wherein the function setting data is image data to be displayed on the display means.

8. The controller apparatus according to claim 7, wherein the function setting data further includes position specifying data for specifying a position of the image data to be displayed on display means.

9. The controller apparatus according to claim 7, further comprising:
    a memory that stores the image data.

10. The controller apparatus according to claim 8, further comprising:
    a controller that controls, the manipulatable unit, and the communication unit,
    wherein the controller reads the image data based on the position specifying data, and causes the display of the read out image data at specified position of specified display means.

11. The controller apparatus according to claim 10,
    wherein the second detect means detects an amount of manipulation of the second manipulatable unit; and
    wherein the controller changes the specified position to other position based on the detected amount of manipulation.

12. The controller apparatus according to claim 11,
    wherein the controller controls the display means so that the display unit displays at the other position the image displayed at the specified position with maintaining the display style of the image displayed on the display means.

13. The controller apparatus according to claim 10, further comprising:
    a second manipulatable unit;
    a detector that detects an amount of manipulation of the second manipulatable unit; and
    wherein the controller controls the display means so that the display unit displays at other position an image different from the image displayed at the specified position with switching the content of the display based on the detected amount of manipulation.

14. The controller apparatus for controlling an electronic apparatus according to claim 1, wherein the second manipulatable unit is formed of a transparent component.

15. The controller apparatus for controlling an electronic apparatus according to claim 1, wherein the detect means detects an amount of movement of the second manipulatable means.

16. The controller apparatus for controlling an electronic apparatus according to claim 15, further comprising:
    a display style changing unit that changes the image displayed on the display means, based on the detected amount of manipulation.

17. The controller apparatus for controlling an electronic apparatus according to claim 1, wherein the second detect means detects the operation by a different detection method from the detection method in the first detect means.

18. The controller apparatus for controlling an electronic apparatus according to claim 1, wherein the first direction is at right angles to the second direction.

19. An electronic apparatus that is controllable by a remote controller apparatus, comprising:
- a transmitting/receiving unit that performs transmitting and receiving of signals to and from a remote controller apparatus having a first manipulatable unit comprising one or more display means, each of which displays an image relating to a function executable on at least one of the controller apparatus or the electronic apparatus which is controllable by the controller apparatus, a first manipulatable means capable of being manipulated in a first direction, a first detect means for detecting operation on the first manipulatable means by user and a first outputting means for outputting a signal for executing a function corresponding to the image selected by the detected operation;
- a second manipulatable unit arranged on the first manipulatable unit, that comprises a second manipulatable means capable of being manipulated in a second direction which is different from the first direction, a second detect means for detecting operation on a second manipulatable means by a user and a second outputting means which outputs a signal for executing a function corresponding to the image selected by the detected operation; and
- a communication unit that transmits to the electronic apparatus the signal output from at least one of the first manipulatable unit and the second manipulatable unit;
- a memory, into which is stored display information for the purpose of displaying the image; and
- a controller, which in response to a request from the remote controller apparatus to transmit, transmits display information read out from the memory to the remote apparatus,
- wherein said display information is function setting data which includes image data to be displayed on the display means or information for specifying the image data to be displayed on the display means, and
- wherein the function setting data further includes position specifying data for specifying a position of the image data or information to be displayed on the display means.

20. A remote control system comprising:
- a remote controller apparatus comprising a first manipulatable unit comprising one or more display means, each of which displays an image relating to a function executable on at least one of the controller apparatus or the electronic apparatus which is controllable by the controller apparatus, a first manipulatable means capable of being manipulated in a first direction, a first detect means for detecting operation on the first manipulatable means by user and a first outputting means for outputting a signal for executing a function corresponding to the image selected by the detected operation;
- a second manipulatable unit arranged on the first manipulatable unit, that comprises a second manipulatable means capable of being manipulated in a second direction which is different from the first direction, a second detect means for detecting operation on a second manipulatable means by a user and a second outputting means which outputs a signal for executing a function corresponding to the image selected by the detected operation; and
- a communication unit that transmits to the electronic apparatus the signal output from at least one of the first manipulatable unit and the second manipulatable unit; and
- an electronic apparatus which is controllable by the controller apparatus comprising a second memory that stores display information for display of the image, and a transmitting/receiving unit, which in response to a request from the remote controller apparatus to transmit, transmits to the remote controller apparatus display information read out of the second memory,
- wherein said display information is function setting data which includes image data to be displayed on the display means or information for specifying the image data to be displayed on the display means, and
- wherein the function setting data further includes position specifying data for specifying a position of the image data or information to be displayed on the display means.

21. A method for image display comprising the steps of:
- selecting and establishing, from various apparatuses, an apparatus to be controlled by a remote controller apparatus having a first manipulatable unit comprising one or more display means, each of which displays an image relating to a function executable on at least one of the controller apparatus or the electronic apparatus which is controllable by the controller apparatus, a first manipulatable means capable of being manipulated in a first direction, a first detect means for detecting operation on the first manipulatable means by user and a first outputting means for outputting a signal for executing a function corresponding to the image selected by the detected operation;
- providing a second manipulatable unit arranged on the first manipulatable unit, that comprises a second manipulatable means capable of being manipulated in a second direction which is different from the first direction, a second detect means for detecting operation on a second manipulatable means by a user and a second outputting means which outputs a signal for executing a function corresponding to the image selected by the detected operation; and
- providing a communication unit that transmits to the electronic apparatus the signal output from at least one of the first manipulatable unit and the second manipulatable unit;
- requesting that the apparatus send display information for display of the image on the display means; and
- reading out image data stored in a memory of the remote controller apparatus, based on the display information received from the apparatus, and displaying the image of the read out image data on the display means,
- wherein said display information is function setting data which includes information for specifying the image data to be displayed on the display means, and
- wherein the function setting data further includes position specifying data for specifying a position of the information to be displayed on the display means.

22. A computer-readable recording medium into which has been recorded an image display program for execution by a computer, the image display program comprising:
- a step of selecting and establishing from various apparatuses an electronic apparatus to be controlled by a remote controller apparatus having a first manipulatable unit comprising one or more display means, each of which displays an image relating to a function executable on at least one of the controller apparatus or the electronic apparatus which is controllable by the controller apparatus, a first manipulatable means capable of being manipulated in a first direction, a first detect means for detecting operation on the first manipulatable means by user and a first outputting means for outputting a signal for executing a function corresponding to the image selected by the detected operation;

a step of operating a second manipulatable unit arranged on the first manipulatable unit, that comprises a second manipulatable means capable of being manipulated in a second direction which is different from the first direction, a second detect means for detecting operation on a second manipulatable means by a user and a second outputting means which outputs a signal for executing a function corresponding to the image selected by the detected operation; and a step of operating a communication unit that transmits to the electronic apparatus the signal output fiom at least one of the first manipulatable unit and the second manipulatable unit;

a step of requesting that the electronic apparatus send display information to the remote controller apparatus for display of the image; and a step of reading out image data stored in a memory of the remote controller apparatus, based on the image display information received from the electronic apparatus, and displaying the images of the read out image data on the display means, wherein said display information is function setting data which includes image data to be displayed on the display means or information for specifying the image data to be displayed on the display means, and wherein the function setting data further includes position specifying data for specifying a position of the image data or information to be displayed on the display means.

23. A system comprising:

a plurality of electronic apparatuses which are capable of being controlled by a control unit, the control unit comprising a manipulatable unit comprising one or more display means, each of which displays an image relating to a function executable on at least one of the controller apparatus or the electronic apparatus which is controllable by the controller apparatus, a first manipulatable unit comprising one or more display means, each of which displays an image relating to a function executable on at least one of the controller apparatus or the electronic apparatus which is controllable by the controller apparatus, a first manipulatable means capable of being manipulated in a first direction, a first detect means for detecting operation on the first manipulatable means by user and a first outputting means for outputting a signal for executing a function corresponding to the image selected by the detected operation;

a second manipulatable unit arranged on the first manipulatable unit, that comprises a second manipulatable means capable of being manipulated in a second direction which is different from the first direction, a second detect means for detecting operation on a second manipulatable means by a user and a second outputting means which outputs a signal for executing a function corresponding to the image selected by the detected operation; and a communication unit that transmits to the electronic apparatus the signal output from at least one of the first manipulatable unit and the second manipulatable unit, wherein the control unit outputs command signals for controlling the plurality of electric apparatuses based on a manipulation from a user; and a display unit that displays a plurality of images of the plurality of electric apparatuses and selectively displays at least one image for indicating predetermined function from a plurality of images functions, each of which indicates a function which is capable of being executed by at least one of the plurality of electric apparatuses, wherein the control unit outputs a command signal to the at least one of the plurality of electronic apparatuses for controlling the execution of the function being displayed on the display unit.

24. The system according to claim 23, wherein the display unit displays images on a line.

25. The system according to claim 23, further comprising:

a second manipulatable unit; and a detector that detects an amount of manipulation of the second manipulatable unit;

wherein the displayed image is selected based on the detected amount of manipulation.

26. The system according to claim 23, further comprising:

a communication unit that receives an image corresponding to at least one of the other electronic apparatuses and an image corresponding to the other function from the other apparatus;

wherein the display unit is operable to display the received image and the manipulatable unit is operable to output a signal for executing a function corresponding to the selected image among the received images.

27. A controller apparatus for controlling an electronic apparatus comprising:

a first manipulatable unit comprising one or more display means, each of which displays an image relating to a function executable on at least one of the controller apparatus or the electronic apparatus which is controllable by the controller apparatus, a first manipulatable means capable of being manipulated in a first direction, a first detect means for detecting operation on the first manipulatable means by the user, and a first outputting means for outputting a signal for executing a function corresponding to the image selected by the detected operation;

a second manipulatable unit arranged on the first manipulatable unit, that comprises a second manipulatable means capable of being manipulated in a second direction which is different from the first direction, a second detect means for detecting an amount of movement of the second manipulatable means, a specifying means for specifying a function from a plurality of functions, each of which is capable of being executed by at least one of the controller apparatus or the electronic apparatus, and a second outputting means which outputs a signal for executing the specified function; and a communication unit that transmits to the electronic apparatus the signal output from at least one of the first manipulatable unit and the second manipulatable unit.

28. The controller apparatus for controlling an electronic apparatus according to claim 27, wherein the second detect means detects the operation by a different detection method from the detection method in the first detect means.

29. The controller apparatus for controlling an electronic apparatus according to claim 27, wherein at least one of the display means displays the image related to the specified function.

30. The controller apparatus for controlling an electronic apparatus according to claim 27, wherein the first direction is at right angles to the second direction.

31. A method for controlling an electronic apparatus comprising the steps of:

displaying, on a first manipulatable unit, an image relating to a function executable on at least one of a controller apparatus or the electronic apparatus which is controlled by the controller apparatus;

detecting an operation of a first manipulatable means by a user;

outputting a signal for executing a function corresponding to the image selected by the detected operation;

detecting an operation on a second manipulatable means by a user, wherein the second manipulatable means is located on a second manipulatable unit arranged on the first manipulatable unit and the second manipulatable means is capable of being manipulated in a second direction which is different from a first direction that the first manipulatable means is capable of being manipulated in;

outputting a signal for executing a function corresponding to the image selected by the second detected operation; and transmitting to the electronic apparatus the signal output from at least one of the first or second outputting steps.

32. A method for controlling an electronic apparatus comprising the steps of:

displaying, on a first manipulatable unit, an image relating to a function executable on at least one of a controller apparatus or the electronic apparatus which is controlled by the controller apparatus;

detecting an operation of a first manipulatable means by a user;

outputting a signal for executing a function corresponding to the image selected by the detected operation;

detecting an amount of movement on a second manipulatable means by a user, wherein the second manipulatable means is located on a second manipulatable unit arranged on the first manipulatable unit and the second manipulatable means is capable of being manipulated in a second direction which is different from a first direction that the first manipulatable means is capable of being manipulated in;

specifying a function from a plurality of functions, each of which is capable of being executed by at least one of the controller apparatus or the electronic apparatus;

outputting a signal for executing a function corresponding to the image selected by the specified function; and transmitting to the electronic apparatus the signal output from at least one of the first or second outputting steps.

* * * * *

UNITED STATES PATENT AND TRADEMARK OFFICE
CERTIFICATE OF CORRECTION

| | | |
|---|---|---|
| PATENT NO. | : 7,298,311 B2 | Page 1 of 1 |
| APPLICATION NO. | : 10/308544 | |
| DATED | : November 20, 2007 | |
| INVENTOR(S) | : Hiromasa Horie et al. | |

It is certified that error appears in the above-identified patent and that said Letters Patent is hereby corrected as shown below:

Column 16, line 42 should read:

on [a] the second manipulatable means by a user and a

Column 17, line 17 should read:

on [a] the second manipulatable means by a user and a

Signed and Sealed this
Twenty-ninth Day of January, 2013

David J. Kappos
*Director of the United States Patent and Trademark Office*